United States Patent [19]
Kojima et al.

[11] Patent Number: 5,153,078
[45] Date of Patent: Oct. 6, 1992

[54] RADIATION IMAGE STORAGE PANEL, RADIOGRAPHIC INTENSIFYING SCREEN AND PROCESSES FOR THE PREPARATION OF THE SAME

[75] Inventors: Yasushi Kojima; Katsuhiro Kohda; Hiroshi Matsumoto; Akira Kitada; Kikuo Yamazaki, all of Kaisei, Japan

[73] Assignee: Fuji Photo Film Co., Ltd., Kanagawa, Japan

[21] Appl. No.: 696,023

[22] Filed: May 6, 1991

Related U.S. Application Data

[62] Division of Ser. No. 510,679, Apr. 18, 1990.

[30] Foreign Application Priority Data

| Apr. 19, 1989 | [JP] | Japan | 1-101443 |
| Apr. 19, 1989 | [JP] | Japan | 1-101444 |
| Apr. 19, 1989 | [JP] | Japan | 1-101445 |
| Apr. 19, 1989 | [JP] | Japan | 1-101446 |
| Jun. 19, 1989 | [JP] | Japan | 1-157292 |
| Jun. 19, 1989 | [JP] | Japan | 1-157293 |
| Jun. 19, 1989 | [JP] | Japan | 1-157294 |

[51] Int. Cl.$^5$ .............................. B32B 9/06
[52] U.S. Cl. .................... 428/690; 428/917; 250/483.1; 252/301.4 F
[58] Field of Search ................ 428/690, 917; 250/483.1; 252/301.4 F

[56] References Cited

U.S. PATENT DOCUMENTS

| 4,829,181 | 5/1989 | Shinomiya et al. | 250/483.1 |
| 4,921,727 | 5/1990 | Datta et al. | 427/57 |
| 4,952,813 | 8/1990 | Miyahara et al. | 250/483.1 |

*Primary Examiner*—Ellis P. Robinson
*Assistant Examiner*—Charles R. Nold
*Attorney, Agent, or Firm*—Sixbey, Friedman, Leedom & Ferguson

[57] ABSTRACT

Disclosed in a radiation image storage panel comprising a support and a compressed phosphor layer provided thereon which contains a phosphor and a binder of which 10 wt. %–100 wt. % content is thermoplastic elastomer. Further disclosed is a radiographic intensifying screen having the same structure as the above radiation image storage panel. The processes for preparation of the radiation image storage panel and the radiographic intensifying screen are also disclosed.

7 Claims, 7 Drawing Sheets

RADIATION IMAGE STORAGE PANEL, RADIOGRAPHIC INTENSIFYING SCREEN AND PROCESSES FOR THE PREPARATION OF THE SAME

This is a divisional application of Ser. No. 07/510,679, filed Apr. 18, 1990.

BACKGROUND OF THE INVENTION

1. Field of the Invention

The present invention relates to a radiation image storage panel employable in a radiation image recording and reproducing method utilizing a stimulable phosphor, and a process for the preparation of the same. Further, this invention relates to a radiographic intensifying screen and a process for the preparation of the same.

2. Description of Prior Arts

In a variety of radiography such as medical radiography for diagnosis and industrial radiography for nondestructive inspection, a radiographic intensifying screen is employed in close contact with one or both surfaces of a radiographic film such as X-ray film for enhancing the radiographic speed of the system. The radiographic intensifying screen consists essentially of a support and a phosphor layer provided thereon. Further, a transparent film is generally provided on the free surface of the phosphor layer to keep the layer from chemical deterioration and physical shock.

The phosphor layer comprises a binder and phosphor particles dispersed therein. The phosphor layer is generally provided on a support under an atmospheric pressure utilizing the following coating procedure.

The phosphor particles and the binder are mixed in an appropriate solvent to prepare a coating dispersion. The coating dispersion is directly applied onto a surface of a support for radiographic intensifying screen under an atmospheric pressure using a doctor blade, roll coater, knife coater or the like, and the solvent contained in the coating dispersion applied is removed to form a phosphor layer. Alternatively, the phosphor layer is provided on the support by applying the coating dispersion to form a phosphor sheet, peeling off the sheet from the false support, and then causing the sheet to adhere to the genuine support.

When excited with a radiation such as X-rays passing through an object, the phosphor particles contained in the phosphor layer emit light of high luminance in proportion to the dose of the radiation. Accordingly, an X-ray film placed in close contact sufficiently to form a radiation image of the object, even if the radiation is applied to the object at a relatively small dose.

It is desired for the radiographic intensifying screen having the above-mentioned basic structure to exhibit a high radiographic speed and to provide an image of high quality (high sharpness and high graininess).

The radiographic speed of the radiographic intensifying screen is essentially determined by the total amount of emission given by the phosphor contained therein, and the total amount varies depending upon not only the emission luminance of the phosphor but also the content (i.e., amount) of the phosphor in the phosphor layer. The large content of the phosphor also results in increase of absorption of a radiation such as X-rays, so that the screen shows high radiographic speed and provides an image of improved quality, especially graininess. On the other hand, assuming that the content of the phosphor layer is kept at the same level, a screen utilizing such a phosphor layer provides an image of high sharpness if the phosphor layer is densely packed with the phosphor, because such phosphor layer can be made thinner to reduce spread of stimulating rays caused by scattering in the phosphor layer.

The present applicant has already applied for patent with respect to a radiographic intensifying screen having a phosphor layer in which the phosphor is densely packed. The phosphor layer of the application is compressed to lower the void ratio (U.S. Pat. No. 4,952,813; European Patent Application No. 83108541.0). In the specification of the application, disclosed are examples of resins employable for the binder of the phosphor layer, for example, natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester.

The phosphor density in the phosphor layer of the above-mentioned screen is heightened by compressing the phosphor layer, and an image provided by the screen exhibits improved sharpness as compared with one obtained by a conventional radiographic intensifying screen. However, with respect to the radiographic speed and the graininess, some of the above-mentioned screens rather deteriorate.

As a method replacing a conventional radiography using a radiographic intensifying screen, a radiation image recording and reproducing method utilizing a stimulable phosphor is described, for instance, in U.S. Pat. No. 4,239,968 and is practically used. In the method, a radiation image storage panel comprising a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at a considerably smaller dose, as compared with the conventional radiography using a combination of a radiographic film and a radiographic intensifying screen.

The radiation image storage panel employed in the above-described method generally comprises a support and a stimulable phosphor layer provided on one surface of the support. However, if the phosphor layer is self-supporting, the support may be omitted. Further, a transparent film is generally provided on the free surface of the phosphor layer to keep the layer from chemical deterioration and physical shock.

The stimulable phosphor layer generally comprises a binder and stimulable phosphor particles dispersed therein, and the stimulable phosphor emits light (stimulated emission) when excited with an electromagnetic wave (stimulating rays) such as visible light or infrared rays after having been exposed to a radiation such as X-rays. Accordingly, the radiation having passed through an object or radiated from an object is absorbed by the stimulable phosphor layer of the panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

As described hereinbefore, the radiation image recording and reproducing method is very advantageous for obtaining a radiation image as a visible image. It is desired for the radiation image storage panel employed for the method, as well as a radiographic intensifying screen employed for a conventional radiography, to have a high sensitivity and provide an image of high quality (high sharpness and high graininess).

The sensitivity of the radiation image storage panel is essentially determined by the total amount of stimulated emission given by the stimulable phosphor contained therein, and the total amount varies depending upon not only the emission luminance of the phosphor but also the content (i.e., amount) of the phosphor in the phosphor layer. The large content of the phosphor also results in increase of absorption of a radiation such as X-rays, so that the panel shows an increased high sensitivity and provides an image of improved quality, especially graininess. On the other hand, assuming that the content of the phosphor layer is kept at the same level, a panel utilizing such a phosphor layer provides an image of high sharpness if the phosphor layer is densely packed with the phosphor, because such phosphor layer can be made thinner to reduce spread of stimulating rays caused by scattering in the phosphor layer.

The present applicant has already applied for patent with respect to a radiation image storage panel having a phosphor layer in which the stimulable phosphor is densely packed. The phosphor layer of the application is compressed to lower the void ratio (U.S. Pat. No. 4,910,419; European Patent Application No. 011365.6). In the specification of the application, disclosed are examples of resins employable for the binder of the phosphor layer, for example, natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester.

The phosphor density in the phosphor layer of the above-mentioned panel is heightened by compressing the phosphor layer, and an image provided by the panel exhibits improved sharpness as compared with one obtained by a known radiation image storage panel. However, with respect to the graininess, some of the above-mentioned panels rather deteriorate.

SUMMARY OF THE INVENTION

The present inventors have studied for solving the above problems and found that the resin employed for the binder was so rigid that the phosphor included in compressed phosphor layers of the above-mentioned radiographic intensifying screen and radiation image storage panel were destroyed by compression treatment. Consequently, the graininess is lowered by compression treatment. In the present invention, thermoplastic elastomer is employed for the binder in order to avoid the deterioration of the graininess by compressing the phosphor layer.

It is an object of the present invention to provide a radiation image storage panel providing an image of not only high sharpness but also high graininess with high sensitivity, and a process for the preparation of the same.

It is another object of the present invention to provide a radiographic intensifying screen providing an image of not only high sharpness but also high graininess with high radiographic speed, and a process for the preparation of the same.

There is provided by the present invention a process for the preparation of a radiation image storage panel comprising:

A) forming a phosphor layer comprising a stimulable phosphor and a binder of which 10 wt. %–100 wt. % content is thermoplastic elastomer on a support, B) compressing said phosphor layer at the temperature not lower than softening point or melting point of said thermoplastic elastomer.

There is also provided by the invention a process for the preparation of a radiation image storage panel comprising:

A') forming a phosphor sheet comprising a stimulable phosphor and a binder of which 10 wt. %–100 wt. % content is thermoplastic elastomer, B') compressing said phosphor sheet at the temperature not lower than softening point or melting point of said thermoplastic elastomer, C') affixing said compressed phosphor sheet on a support.

There is further provided by the invention a process for the preparation of a radiation image storage panel comprising:

a) forming a phosphor sheet comprising a stimulable phosphor and a binder, b) laying said phosphor sheet onto a support, then compressing and affixing simultaneously said phosphor sheet on said support at the temperature not lower than softening point or melting point of said binder.

There is further provided by the invention a radiation image storage panel essentially comprising a support and a phosphor layer provided thereon which contains a stimulable phosphor and a binder; wherein the packing ratio of said phosphor in said phosphor layer is not less than 70% and 10 wt. %–100 wt. % content of said binder is thermoplastic elastomer.

There is further provided by the invention a process for the preparation of a radiation image storage panel comprising:

a') treating particles of a stimulable phosphor with titanate coupling agent, b') forming a phosphor sheet comprising said resulting stimulable phosphor and a binder, c') laying said phosphor sheet onto a support, then compressing and affixing simultaneously said phosphor sheet on said support at the temperature not lower than softening point or melting point of said binder.

By the above process, obtained is a radiation image storage panel essentially comprising a support and a phosphor layer provided thereon which contains a stimulable phosphor and a binder; wherein the particles of said phosphor in said phosphor layer are treated with a titanate coupling agent, and said phosphor layer is compressed.

There is also provided by the present invention a process for the preparation of a radiographic intensifying screen comprising:

A) forming a phosphor layer comprising a phosphor and a binder of which 10 wt. %–100 wt. % content is thermoplastic elastomer on a support, B) compressing said phosphor layer at the temperature not lower than softening point or melting point of said thermoplastic elastomer.

There is also provided by the invention a process for the preparation of a radiographic intensifying screen comprising:

A') forming a phosphor sheet comprising a phosphor and a binder of which 10 wt. %–100 wt. % content is thermoplastic elastomer, B') compressing said phosphor sheet at the temperature not lower than softening point or melting point of said thermoplastic elastomer, C') affixing said compressed phosphor sheet on a support.

There is further provided by the invention a process for the preparation of a radiographic intensifying screen comprising:

a) forming a phosphor sheet comprising a phosphor and a binder, b) laying said phosphor sheet onto a support, then compressing and affixing simultaneously said phosphor sheet on said support at the temperature not lower than softening point or melting point of said binder.

There is also provided by the invention a radiographic intensifying screen essentially comprising a support and a phosphor layer provided thereon which contains a phosphor and a binder; wherein the packing ratio of said phosphor in said phosphor layer is not less than 67% and 10 wt. %–100 wt. % content of said binder is thermoplastic elastomer.

In the process for preparation of a radiation image storage panel and a radiographic intensifying screen of the invention, thermoplastic elastomer is employed for the binder in the phosphor layer. Therefore, the destruction of the phosphor in the compression treatment can be reduced by compressing the phosphor layer at the temperature not lower than softening point or melting point of the thermoplastic elastomer. Moreover, the destruction of the phosphor can be more reduced by the process of the invention, in which beforehand formed phosphor sheet comprising a phosphor and a binder is simultaneously compressed and affixed on a support at the temperature not lower than softening point or melting point of the binder. Further, if the phosphor is treated with titanate coupling agent in this process, an image provided by the obtained radiation image storage panel has more improved quality.

The phosphor crystals dispersed in a heated binder can move somewhat in a compression treatment at the temperature not lower than softening point or melting point of the binder. Therefore, the phosphor crystals can be oriented by the pressure in the treatment. Moreover, in the case where the phosphor sheet is not beforehand fixed on a support but simultaneously compressed and affixed on the support, the pressure bearing the sheet not only orients the phosphor crystals but also extends the sheet gradually, and the phosphor crystal can move more easily in the binder. Therefore, the compression treatment can be effectively carried out under a strong pressure, even if the pressure is strong enough to destroy phosphor crystals when stress concentration is induced by friction of the phosphor particles in a sheet beforehand fixed on the support. Further, assuming that the pressure bearing the sheet is kept at the same level, the sheet simultaneously compressed and affixed on the support has a higher packing ratio of the phosphor than that of the sheet beforehand fixed on the support.

Aggregates of phosphor particles can be loosen and the phosphor particles can be dispersed homogeneously with titanate coupling agent. Because titanate coupling agent, in contrast with silane coupling agent, can form an organic monomolecular film on a surface of inorganic material, and improve adhesion between organic material and inorganic material.

In the radiation image storage panel of the invention using titanate coupling agent, phosphor particles are treated with titanate coupling agent and are dispersed homogeneously. Therefore in the process for preparation of the panel, a compression treatment is carried out in the condition that the affinity between the phosphor particles and the binder resin is improved, and the destruction of the phosphor particles caused by friction among themselves can be avoided. Moreover, since a phosphor sheet beforehand formed is laid on a support and then simultaneously compressed and affixed on the support in this process of the invention, the destruction of the phosphor particles can be more considerably avoided.

BRIEF DESCRIPTION OF DRAWINGS

Each of FIG. 1

Each of FIG. 5

DETAILED DESCRIPTION OF THE INVENTION

Figure 1:
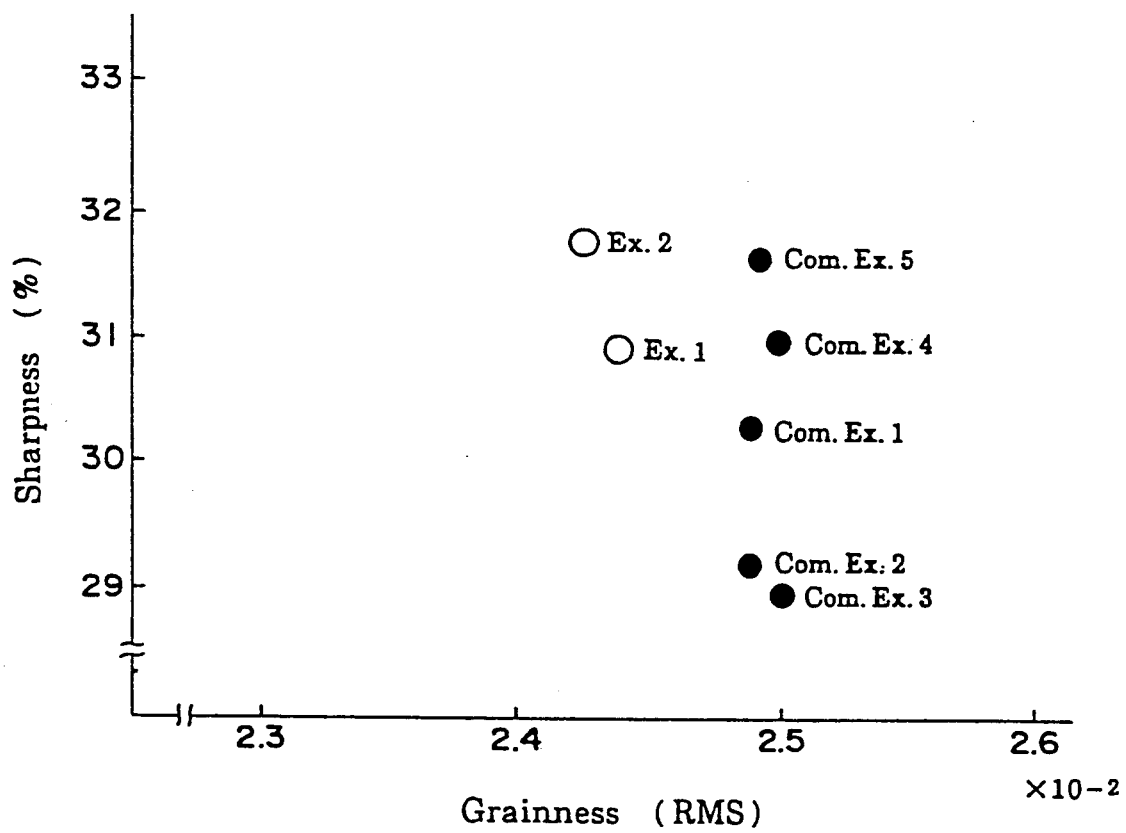

The radiation image storage panel of the present invention and the process for the preparation of the same are now described in more detail.

The radiation image storage panel of the invention is characterized by employing thermoplastic elastomer as a binder.

First of all, below described is a process for the preparation of the panel in which a compression treatment and an affixing step are separately carried out.

There are provided by the present invention a process for the preparation of a radiation image storage panel comprising:

A) forming a phosphor layer comprising a stimulable phosphor and a binder of which 10 wt. %–100 wt. % content is thermoplastic elastomer on a support, B) compressing said phosphor layer at the temperature not lower than softening point or melting point of said thermoplastic elastomer;

and a process for the preparation of a radiation image storage panel comprising:

A') forming a phosphor sheet comprising a stimulable phosphor and a binder of which 10 wt. %–100 wt. % content is thermoplastic elastomer, B') compressing said phosphor sheet at the temperature not lower than softening point or melting point of said thermoplastic elastomer, C') affixing said compressed phosphor sheet on a support.

The above process for the preparation of the panel comprises; forming a phosphor layer or sheet comprising a phosphor and a binder, and compressing it at the temperature not lower than softening point or melting point of the thermoplastic elastomer containing the binder.

In the first place, prepared is a coating dispersion for the formation of a phosphor layer comprising a stimulable phosphor, a binder and an appropriate solvent.

The stimulable phosphor employed for the present invention is described below.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300-500 nm when excited with stimulating rays in the wavelength region of 400-900 nm.

Examples of the stimulable phosphors employable in the radiation image storage panel of the invention include:

BaSO$_4$:A,X and SrSO$_4$:A,X;
Li$_2$B$_4$O$_7$:Cu,Ag;
Li$_2$O.(B$_2$O$_2$)$_x$:Cu and Li$_2$O.(B$_2$O$_2$)$_x$:Cu,Ag
SrS:Ce,Sm, SrS:Eu,Sm, ThO$_2$:Er, and La$_2$O$_2$S:Eu,Sm;
ZnS:Cu,Pb, BaO.xAl$_2$O$_3$:Eu, in which x is a number satisfying the condition of $0.8 \leq x \leq 10$, and M$^{II}$O.xSiO$_2$:A, in which M$^{II}$ is at least one divalent metal element selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$;

(Ba$_{1-x-y}$,Mg$_x$,Ca$_y$)FX:aEu$^{2+}$, in which X is at least one element selected from the group consisting of Cl and Br, a and y are numbers satisfying the conditions of $0 < x+y \leq 0.6$ and $xy \neq 0$, and a is a number satisfying the condition of $10^{-6} \leq a \leq 5 \times 10^{-2}$;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$;

(Ba$_{1-x}$,M$^{II}$x)FX:yA, in which M$^{II}$ is at least one divalent metal element selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively;

M$^{II}$FX.xA:yLn, in which M$^{II}$ is at least one element selected from the group consisting of Ba, Ca, Sr, Mg, Zn and Cd; A is at least one compound selected from the group consisting of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$ and ThO$_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leq x \leq 0.5$ and $0 \leq y \leq 0.2$, respectively;

(Ba$_{1-x}$,M$^{II}$x)F$_2$.aBaX$_2$:yEu,zA, in which M$^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leq a \leq 1.25$, $0 \leq x \leq 1$, $10^{-6} \leq y \leq 2 \times 10^{-1}$, and $0 \leq z \leq 10^{-2}$, respectively;

(Ba$_{1-x}$,M$^{II}$x)F$_2$.aBaX$_2$:yEu,zB, in which M$^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 2 \times 10^{-1}$, respectively;

(Ba$_{1-x}$,M$^{II}$x)F$_2$.aBaX$_2$:yEu,zA, in which M$^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 5 \times 10^{-1}$, respectively;

M$^{III}$OX:xCe, in which M$^{III}$ is at least one trivalent metal element selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$;

Ba$_{1-x}$M$_{x/2}$L$_{x/2}$FX:yEu$^{2+}$, in which M is at least one alkali metal element selected from the group consisting of Li, Na, K, Rb and Cs; L is at least one trivalent metal element selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively;

BaFX.xA:yEu$^{2+}$, in which X is at least one halogen selected from the group consisting of Cl, Br and I; A is at least one fired product of a tetrafluoroboric acid compound; and x and y are numbers satisfying the conditions of $10^{-6} \leq x \leq 0.1$ and $0 < y \leq 0.1$, respectively;

BaFX.xA:yEu$^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively;

BaFX.xNaX$_s$:aEu$^{2+}$, in which each of X and X$_s$ is at least one halogen selected from the group consisting of Cl, Br and I; and x and a are numbers satisfying the conditions of $0 < x \leq 2$ and $0 < a \leq 0.2$, respectively;

M$^{II}$FX.xNaX':yEu$^{2+}$:zA, in which M$^{II}$ is at least one alkaline earth metal element selected from the group consisting of Ba, Sr and Ca; each of X and X' is at least one halogen selected from the group consisting of Cl, Br and I; A is at least one transition metal element selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively;

M$^{II}$FX.aM$^{I}$X'.bM$'^{II}$X''$_2$.cM$^{III}$X'''$_3$.xA:yEu$^{2+}$, in which M$^{II}$ is at least one alkaline earth metal element selected from the group consisting of Ba, Sr and Ca; M$^{I}$ is at least one alkali metal element selected from the group consisting of Li, Na, K, Rb and Cs; M'II is at least one divalent metal element selected from the group consisting of Be and Mg; $M^{III}$ is at least one trivalent metal element selected from the group consisting of Al, Ga, In and Tl; A is at least one metal oxide; X is at least one halogen selected from the group consisting of Cl, Br and I; each of X', X" and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$, and x and y are numbers satisfying the conditions of $0 < x \leq 0.5$ and $0 < y \leq 0.2$. respectively;

$M^{II}X_2.aM^{II}X'_2:xEu^{2+}$, in which $M^{II}$ is at least one alkaline earth metal element selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively;

$M^{II}FX.aM^{I}X':xEu^{2+}$, in which $M^{II}$ is at least one alkaline earth metal element selected from the group consisting of Ba, Sr and Ca; $M^I$ is at least one alkali metal element selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 < a \leq 4.0$ and $0 < x \leq 0.2$, respectively; and $M^{I}X:xBi$, in which $M^I$ is at least one alkali metal element selected from the group consisting of Rb and Cs; X is at least one halogen selected from the group consisting of Cl, Br and I; and x is a number satisfying the condition of $0 < x \leq 0.2$.

The $M^{II}X_2aM^{II}X'_2xEu^{2+}$ phosphor may further contain the following additives for 1 mol of $M^{II}X_2.aM^{II}X'_2$:

$bM^{I}X''$, in which $M^I$ is at least one alkali metal element selected from the group consisting of Rb and Cs; X" is at least one halogen selected from the group consisting of F, Cl, Br and I; and b is a number satisfying the condition of $0 < b \leq 10.0$;

$bKX''.cMgX'''_2.dM^{III}X''''_3$, in which $M^{III}$ is at least one trivalent metal element selected from the group consisting of Sc, Y, La, Gd and Lu; each of X", X''' and X'''' is at least one halogen selected from the group consisting of F, Cl, Br and I; and b, c and d are numbers satisfying the conditions of $0 \leq b \leq 2.0$, $0 \leq c \leq 2.0$ and $0 \leq d \leq 2.0$, and $2 \times 10^{-5} \leq b+c+d$;

bA, in which A is at least one oxide selected from the group consisting of $SiO_2$ and $P_2O_5$; and b is a number satisfying the condition of $10^{-4} \leq b \leq 2 \times 10^{-}$;

yB (boron), in which y is a number satisfying the condition of $2 \times 10^{-4} \leq b \leq 2 \times 10^{-1}$;

bSiO, in which b is a number satisfying the condition of $0 < b \leq 3 \times 10^{-2}$;

$bSnX''_2$, in which X" is at least one halogen selected from the group consisting of F, Cl, Br and I; and b is a number satisfying the condition of $0 < b \leq 10^{-3}$;

$bCsX''.cSnX'''_2$, in which each of X" and X''' is at least one halogen selected from the group consisting of F, Cl, Br and I; and b and c are numbers satisfying the conditions of $0 < b \leq 10.0$ and $10^{-6} \leq c \leq 2 \times 10^{-2}$, respectively; and $bCsX''.yLn^{3+}$, in which X" is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0 < b \leq 10.0$ and $10^{-6} \leq y \leq 1.8 \times 10^{-1}$, respectively.

Among the above-described stimulable phosphors, the divalent europium activated alkaline earth metal halide phosphor is particularly preferred, because the phosphor shows stimulated emission of high luminance. The above-described stimulable phosphors are by no means given to restrict the stimulable phosphor employable in the present invention, and any other phosphors can be also employed, provided that the phosphor gives stimulated emission when excited with stimulating rays after exposure to a radiation.

The above-described stimulable phosphor and a binder are added to an appropriate solvent, and they are well mixed to prepare a coating dispersion for the formation of a phosphor layer in which the stimulable phosphor particles are homogeneously dispersed in a binder solution.

With respect to the binder, thermoplastic elastomer is used for 10 wt. %–100 wt. % content of the binder.

The destruction of the phosphor in a compression treatment can be avoid with thermoplastic elastomer, because it has elasticity at room temperature and has fuidity when it is heated. Examples for thermoplastic elastomers include; styrenics thermoplastic elastomer, polyolefin thermoplastic elastomer, thermoplastic polyurethane elastomer, polyester thermoplastic elastomer, polyamide thermoplastic elastomer, thermoplastic polybutadiene, ethylene-vinyl acetate copolymer, polyvinyl chloride thermoplastic elastomer, thermoplastic natural rubber, fluorocarbon thermoplastic elastomer, thermoplastic polyisoprene elastomer, chlorinated polyethylene elastomer, styrene-butadiene rubber and silicone rubber.

Softening point (temperature) or melting point of the thermoplastic elastomer employable for the invention is generally within the range of 30° C.–300° C., preferably within the range of 30° C.–200° C. and more preferably within the range of 30° C.–150° C.

If a ratio of thermoplastic elastomer to the total binder is kept within the range of 10 wt. %–100 wt. %, the effect of the invention can be achieved. However, the binder preferably includes as much thermoplastic elastomer as possible, and therefore it is most preferable that the binder consists of thermoplastic elastomer in its 100 wt. % content.

Examples of the binders other than thermoplastic elastomer include: natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol and linear polyester.

Examples of the solvents employable in the preparation of the dispersion include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether and ethylene glycol monomethyl ether; and mixtures of the above-mentioned compounds.

The ratio between the binder and the stimulable phosphor in the coating solution may be determined according to the characteristics of the aimed radiation image storage panel and the nature of the employed stimulable phosphor. Generally, the ratio therebetween is in the range of from 1:1 to 1:100 (binder:phosphor, by weight), preferably in the range of from 1:8 to 1:40, by weight.

The coating solution may contain various additives such as a dispersing agent to improve the dispersibility of the phosphor particles therein and a plasticizer to increase the bonding between the binder and the phosphor particles in the resulting phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate, and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

In the case where the phosphor layer is formed directly on a support, the coating dispersion containing the stimulable phosphor and the binder prepared as above is applied evenly to the surface of a support to form a layer of the coating dispersion. The coating procedure can be carried out by a conventional method such as a method of using a doctor blade, a roll coater or a knife coater.

The coated film is dried to complete a phosphor layer.

A support material employable in the invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ceramic sheets such as sheets of alumina, zirconia, magnesia and titania; ordinary papers; baryta paper; resin-coated papers; pigment papers containing titanium dioxide or the like; and papers sized with polyvinyl alcohol or the like.

In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provide thereby. For example, a subbing layer or an adhesive layer may be provided by coating a polymer material such as gelatin over the surface of the support on the phosphor layer side. Otherwise, a light-reflecting layer or a light-absorbing layer may be provide by forming a polymer material layer containing a light-reflecting material such as titanium dioxide or a light-absorbing material such as carbon black. In the invention, one or more of these additional layers may be provided on the support, and the constitution thereof can be optionally selected depending upon the purpose of the radiation image storage panel.

As described in U.S. patent application No. 496,278, the phosphor layer-side surface of the support (or the surface of an adhesive layer, light-reflecting layer, or light-absorbing layer in the case that such layers are provided on the phosphor layer) may be provided with protruded and depressed portions for enhancement of the sharpness of a radiation image.

The phosphor layer can be provided on the support by the methods other than that given in the above. For example, a phosphor sheet is initially prepared and the sheet is then overlaid on the genuine support by using an adhesive agent.

The process for preparation of the phosphor sheet comprises applying the coating dispersion onto false support, drying the coated film and peeling off the film to obtain the phosphor sheet for the phosphor layer of the radiation image storage panel. Therefore, the surface of the false support is preferably beforehand coated with a release agent so that the sheet may be easily peeled off.

In the above-described manner, the phosphor layer or sheet comprising a stimulable phosphor and a binder can be prepared. The false support material employable can be selected from the aforementioned support materials.

In the second place, below described is a compression treatment.

The phosphor layer provided by coating the dispersion directly on a support or by overlaying the sheet on the support is compressed. Of course, the phosphor sheet may be compressed alone before overlaying on the support, and then the compressed sheet may be affixed on the support by using adhesive agent.

Compression is carried out at the temperature not lower than softening point or melting point of the thermoplastic elastomer in the binder.

Examples of the compressing apparatus for the compression treatment employable in the invention include known apparatus such as a calender roll and a hot press. For instance, a compression treatment using a calender roll involves moving a phosphor sheet on a support to pass through between two rollers heated at the temperature not lower than softening point or melting point of the thermoplastic elastomer in the binder. The compressing apparatus employable in the invention is not restricted to the calender roll and hot press. Any other apparatus can be employed as far as it can compress a sheet such as the above-mentioned one under heating.

The pressure in compression is generally not less than 50 kgw/cm$^2$.

The radiation image storage panel prepared by the above-described process provides an image having a good quality as compared with that provided by a known panel. Moreover, an image having a more improved quality can be provided by the panel prepared by the following process, in which a phosphor sheet is simultaneously compressed and affixed on a support.

There is further provided by the invention a process for the preparation of a radiation image storage panel comprising:

a) forming a phosphor sheet comprising a stimulable phosphor and a binder, b) laying said phosphor sheet onto a support, then compressing and affixing simultaneously said phosphor sheet on said support at the temperature not lower than softening point or melting point of said binder.

In the first place, Step a) is described below.

A phosphor sheet for a phosphor layer of radiation image storage panel can be prepared in the same process as described above. Namely, the process comprises applying the coating dispersion (i.e., a binder solution in which a stimulable phosphor homogeneously dispersed)

onto a false support, drying the coated film and peeling off the film to obtain the sheet.

In this process, materials for a binder are not restricted to thermoplastic elastomers. However, thermoplastic elastomers are preferably employed for a binder.

The manner of the preparation of a phosphor sheet, such as the preparation of the coating dispersion, the way of coating and examples of a false support, is completely the same as described above.

In the second place, Step b) is described below.

A support for a radiation image storage panel is prepared independently of the phosphor sheet formed in the above-describe manner. The support can be freely selected from the same materials employable for a false support.

Of course, an adhesive layer, light-reflecting layer or light-absorbing layer may be provided on the support in this process.

The phosphor sheet obtained in Step a) is laid onto a support, then simultaneously compressed and affixed on the support at the temperature not lower than softening point or melting point of the binder.

In this process, the phosphor sheet is not beforehand fixed on a support but simultaneously compressed and affixed on the support. Therefore the pressure extends the sheet and the destruction of the phosphor can be avoided. On the other hand, assuming that the pressure bearing the sheet is kept at the same level, the sheet simultaneously compressed and affixed on the support has higher packing ratio of the phosphor than that of the sheet beforehand fixed on the support.

Examples of the compressing apparatus for the compression treatment employable in the invention include the same as described above, namely known apparatus such as a calender roll and a hot press. For instance, a compression treatment using a calender roll involves moving a phosphor sheet on a support to pass through between two rollers heated at the temperature not lower than softening point or melting point of the thermoplastic elastomer in the binder. The compressing apparatus employable in the invention is not restricted to the calender roll and hot press. Any other apparatus can be employed as far as it can compress a sheet such as the above-mentioned one under heating.

The pressure in compression is generally not less than 50 kgw/cm$^2$.

An image having a further improved quality can be provided by the panel prepared by the following process, in which a phosphor sheet comprising phosphor particles treated with titanate coupling agent is simultaneously compressed and affixed on a support.

A radiation image storage panel of the invention comprising phosphor particles treated with titanate coupling agent is prepared by the following process.

There is further provided by the invention a process for the preparation of a radiation image storage panel comprising:

a') treating particles of a stimulable phosphor with titanate coupling agent, b') forming a phosphor sheet comprising said resulting stimulable phosphor and a binder, c') laying said phosphor sheet onto a support, then compressing and affixing simultaneously said phosphor sheet on said support at the temperature not lower than softening point or melting point of said binder.

In the first place, Step a') is described below.

In Step a'), phosphor particles are treated with titanate coupling agent. In the chemical structure, titanate coupling agent has both a hydrophilic group and a group which reacts or improves affinity with polymer material. Aggregates of particles can be loosen and the particles can be dispersed homogeneously with titanate coupling agent. Because titanate coupling agent, in contrast with silane coupling agent, can form an organic monomolecular film on a surface of inorganic material, and improve adhesion between organic material and inorganic material. Examples of titanate coupling agents include: isopropyl octanoyl titanate, isopropyl dimethacryl isostearoyl titanate, isopropyl triisostearoyl titanate, isopropyl tris(N-aminoethyl-aminoethyl) titanate, tetra(2,2-diallyloximethyl-1-butyl) bis(di-tridecyl) phosphite titanate, isopropyl tridodecylbenzenesulfonyl titanate, isopropyl isostearoyl diactyl titanate, isopropyl tri(dioctylphosphate) titanate, isopropyl tricumylphenyl titanate and tetraisopropyl bis(dioctylphosphite) titanate. Among them, coupling agents of pale yellow liquid, such as tetraoctyl bis(di-tridecylphosphite) titanate, bis(dioctylpyrophospate) oxiacetate titanate and bis(dioctylpyrophospate) ethylene titanate, are preferably employed because the color of these agent does not affect the simulating ray and emission light.

The method of treatment can be selected from known methods such as dry direct treatment, treatment by solution and water slurry treatment, depending upon a phosphor and a coupling agent employed.

Steps b') and c') can be carried out in the same manner as above-described Step a) and b).

In this process, materials for a binder are not restricted to thermoplastic elastomers. However, thermoplastic elastomers are preferably employed for a binder.

The quality of an image provided by the radiation image storage panel prepared by the above precess is better than that provided by the panel obtained by the process in which a phosphor sheet comprising a phosphor with no treatment or treated with other coupling agent (i.e., silane coupling agent) is simultaneously compressed and affixed on a support.

The void ratio of the phosphor layer formed on the support in the manner described above can be calculated theoretically by the following formula (I), $$\frac{V_{air}}{V} = \frac{(a + b)\rho_x\rho_y V - A(a\rho_y + b\rho_x)}{V[(a + b)\rho_x\rho_y - a\rho_y\rho_{air} - b\rho_x\rho_{air}]} \quad (I)$$

in which V is a total volume of the phosphor layer; $V_{air}$ is a volume of air contained in the phosphor layer; A is a total weight of the phosphor; $\rho_x$ is a density of the phosphor; $\rho_y$ is a density of the binder; $\rho_{air}$ is a density of air; a is a weight of the phosphor; and b is a weight of the binder.

In the formula (I), $\rho_{air}$ is nearly 0. Accordingly, the formula (I) can be approximately rewritten in the form of the following formula (II):

$$\frac{V_{air}}{V} = \frac{(a + b)\rho_x\rho_y V - A(a\rho_y + b\rho_x)}{V[(a + b)\rho_x\rho_y]} \quad (II)$$

in which V, $V_{air}$, A, $\rho_x$, $\rho_y$, a and b have the same meaning as defined in the formula (I).

In the present invention, the void ratio of the phosphor layer is expressed by a value calculated according to the formula (II).

The packing ratio of the phosphor in the phosphor layer can be also calculated by the following formula (III), $$\frac{A\, a\rho_y}{V[(a + b)\rho_x\rho_y]} \quad \text{(III)}$$

in which V, A, $\rho_x$, $\rho_y$, a and b have the same meaning as defined in the formula (I).

A radiation image storage panel generally has a transparent film on a free surface of a stimulable phosphor layer to physically and chemically protect the phosphor layer. In the panel of the present invention, it is preferable to provide a transparent film for the same purpose.

The transparent protective film can be formed on the stimulable phosphor layer by coating the surface of the stimulable phosphor layer with a solution of a transparent polymer such as a cellulose derivative (e.g. cellulose acetate or nitrocellulose), or a synthetic polymer (e.g. polymethyl methacrylate, poly-vinyl butyral, polyvinyl formal, polycarbonate, polyvinyl acetate, or vinyl chloride-vinyl acetate copolymer), and drying the coated solution. Alternatively, the transparent film can be provided on the stimulable phosphor layer by beforehand preparing a film for forming a protective film from a plastic sheet made of polyethylene terephthalate, polyethylene naphthalate, polyethylene, polyvinylidene chloride or polyamide; or transparent glass sheet, followed by placing and fixing it onto the stimulable phosphor layer with an appropriate adhesive agent.

The transparent protective film generally has a thickness within the rang of approximately 0.1 to 20 μm.

In addition to the above mentioned layers, the radiation image storage panel of the present invention may have a colored layer which absorbs stimulating rays and does not absorb stimulated emission, in order to improve the sharpness of the image provided thereby (see: Japanese Patent Publication No. 59(1984)-23400).

Among the radiation image storage panels produced by the above-described processes, a panel having a phosphor layer in which the packing ratio of the phosphor is not less than 70% provides an image of excellent quality.

The radiographic intensifying screen of the present invention and the process for the preparation of the same are now described below.

The radiographic intensifying screen of the invention is characterized by employing thermoplastic elastomer as a binder.

First of all, below described is a process for the preparation of the screen in which a compression treatment and an affixing step are separately carried out.

There are provided by the present invention a process for the preparation of a radiographic intensifying screen comprising:

A) forming a phosphor layer comprising a phosphor and a binder of which 10 wt. %–100 wt. % content is thermoplastic elastomer on a support, B) compressing said phosphor layer at the temperature not lower than softening point or melting point of said thermoplastic elastomer.

and a process for the preparation of a radiographic intensifying screen comprising:

A') forming a phosphor sheet comprising a phosphor and a binder of which 10 wt. %–100 wt. % content is thermoplastic elastomer, B') compressing said phosphor sheet at the temperature not lower than softening point or melting point of said thermoplastic elastomer, C') affixing said compressed phosphor sheet on a support.

The above process for the preparation of the screen comprises; forming a phosphor layer or sheet comprising a phosphor and a binder, and compressing it at the temperature not lower than softening point or melting point of the thermoplastic elastomer containing the binder.

In the first place, prepared is a coating dispersion for the formation of a phosphor layer comprising a phosphor, a binder and an appropriate solvent in the same manner as described in the case of the radiation image storage panel.

The phosphor employed for a radiographic intensifying screen of the present invention is described below.

Examples of the phosphor preferably employable in the present invention include:

tungstate phosphors such as $CaWO_4$, $MgWO_4$, and $CaWO_4$:Pb;

terbium activated rare earth oxysulfide phosphors such as $Y_2O_2S$:Tb, $Gd_2O_2S$:Tb, $La_2O_2S$:Tb, $(Y,Gd)_2O_2S$:Tb, and $(Y,Gd)_2O_2S$:Tb,Tm;

terbium activated rare earth phosphate phosphors such as $YPO_4$:Tb, $GdPO_4$:Tb and $LaPO_4$:Tb;

terbium activated rare earth oxyhalide phosphors such as LaOBr:Tb, LaOBr:Tb,Tm, LaOCl:Tb, LaOCl:Tb,Tm, GdOBr:Tb, and GdOCl:Tb;

thulium activated rare earth oxyhalide phosphors such as LaOBr:Tm and LaOCl:Tm;

barium sulfate phosphors such as $BaSO_4$:Pb, $BaSO_4$:$Eu^{2+}$, and $(Ba,Sr)SO_4$:$Eu^{2+}$;

diavalent europium activated alkali earth metal fluorohalide phosphors such as BaFCl:$Eu^{2+}$, BaFBr:$Eu^{2+}$, BaFCl:$Eu^{2+}$,Tb, BaFBr:$Eu^{2+}$,Tb, $BaF_2.BaCl_2.KCl$:$Eu^{2+}$, $BaF_2.BaCl_2.xBaSO_4.KCl$:$Eu^{2+}$, and $Ba,Mg)F_2.BaCl_2.KCl$:KCl:$Eu^{2+}$;

iodide phosphors such as CsI:Na, CsI:Tl, NaI:Tl, and KI:Tl;

sulfide phosphors such as ZnS:Ag, (Zn,Cd)S:Ag, (Zn,Cd)S:Cu, and (Zn,Cd)S:Cu,Al; and hafnium phosphate phosphors such as $HfP_2O_7$:Cu.

The above-described phosphors are given by no means to restrict the phosphor employable in the present invention. Any other phosphors can also be employed, provided that the phosphor emits light having a wavelength within near ultraviolet to visible region when exposed to a radiation such as X-rays.

The above-described phosphor and a binder are added to an appropriate solvent, and they are well mixed to prepare a coating dispersion for the formation of a phosphor layer in which the phosphor particles are homogeneously dispersed in a binder solution in the same manner as in the case of the radiation image storage panel.

With respect to the binder, thermoplastic elastomer is also used for 10 wt. %–100 wt. % content of the binder. Softening point (temperature) or melting point of the thermoplastic elastomer employable for the invention is generally within the range of 30° C.–300° C., preferably within the range of 30° C.–200° C. and more preferably within the range of 30° C.–150° C.

If a ratio of thermoplastic elastomer to the total binder is kept within the range of 10 wt. %–100 wt. %, the effect of the invention can be achieved. However, the binder preferably includes as much thermoplastic elastomer as possible, and therefore it is most preferable that the binder consists of thermoplastic elastomer in its 100 wt. % content.

The manner of the preparation of a coating dispersion, such as a solvent, a ration between a binder and a phosphor and additives such as dispersing agent, is the same as described in the case of the radiation image storage panel.

In the case where the phosphor layer is formed directly on a support, the coating dispersion containing the phosphor and the binder prepared as above is applied evenly to the surface of a support to form a layer of the coating dispersion. The coating procedure can be carried out in the same manner described above.

The coated film is dried to complete a phosphor layer.

A support material employable in the invention can be selected from those aforementioned.

In the preparation of a known radiographic intensifying screen, one or more additional layers are occasionally provided between the support and the phosphor layer, so as to enhance the adhesion between the support and the phosphor layer, or to improve the sensitivity of the screen or the quality of an image (sharpness and graininess) provide thereby. For example, a subbing layer or an adhesive layer may be provided by coating a polymer material such as gelatin over the surface of the support on the phosphor layer side. Otherwise, a light-reflecting layer or a light-absorbing layer may be provide by forming a polymer material layer containing a light-reflecting material such as titanium dioxide or a light-absorbing material such as carbon black. In the invention, one or more of these additional layers may be provided on the support, and the constitution thereof can be optionally selected depending upon the purpose of the radiographic intensifying screen.

The phosphor layer can be provided on the support by the methods other than that given in the above. For example, a phosphor sheet is initially prepared and the sheet is then overlaid on the genuine support by using an adhesive agent.

The phosphor sheet can be prepared in the same manner described above.

In the above-described manner, the phosphor layer or sheet comprising a phosphor and a binder can be prepared.

The phosphor layer provided by coating the dispersion directly on a support or by overlaying the sheet on the support is compressed. Of course, the phosphor sheet may be compressed alone before overlaying on the support, and then the compressed sheet may be affixed on the support by using adhesive agent.

Compressing is carried out at the temperature not lower than softening point or melting point of the thermoplastic elastomer in the binder in the same manner described above.

The radiographic intensifying screen prepared by the above-described process provides an image having a good quality as compared with that provided by a known screen. Moreover, an image having a more improved quality can be provided by the screen prepared by the following process, in which a phosphor sheet is simultaneously compressed and affixed on a support.

There is further provided by the invention a process for the preparation of a radiographic intensifying screen comprising:

a) forming a phosphor sheet comprising a phosphor and a binder, b) laying said phosphor sheet onto a support, then compressing and affixing simultaneously said phosphor sheet on said support at the temperature not lower than softening point or melting point of said binder.

In the first place, Step a) is described below.

A phosphor sheet for a phosphor layer of radiographic intensifying screen can be prepared in the process comprises applying the coating dispersion (i.e., a binder solution in which a stimulable phosphor homogeneously dispersed) onto a false support, drying the coated film and peeling off the film to obtain the sheet.

The manner of the preparation of a coating dispersion, such as a solvent, a ration between a binder and a phosphor and additives such as dispersing agent, is the same as described in the case of the radiation image storage panel.

In this process, materials for a binder are not restricted to thermoplastic elastomers. However, thermoplastic elastomers are preferably employed for a binder.

The coating dispersion containing a phosphor and a binder prepared in the above-described manner is evenly applied onto a false support to form a coated film. The coating can be carried out in the same manner as described above.

The false support material employable can be selected from the aforementioned support materials.

The process for preparation of the phosphor sheet comprises applying the coating dispersion onto false support, drying the coated film and peeling off the film to obtain the phosphor sheet for the phosphor layer of the radiographic intensifying screen. Therefore, the surface of the false support is preferably beforehand coated with a release agent so that the sheet may be easily peeled off.

Step b) is described below

A support for a radiographic intensifying screen is prepared independently of the phosphor sheet formed in the above-describe manner. The support can be freely selected from the same materials employable for a false support.

The phosphor sheet obtained in Step a) is laid onto a support, then simultaneously compressed and affixed on the support at the temperature not lower than softening point or melting point of the binder.

In this process, the phosphor sheet is not beforehand fixed on a support but simultaneously compressed and affixed on the support. Therefore the pressure extends the sheet and the destruction of the phosphor can be avoided. On the other hand, assuming that the pressure bearing the sheet is kept at the same level, the sheet simultaneously compressed and affixed on the support has a higher packing ratio of the phosphor than that of the sheet beforehand fixed on the support.

The manner of the compression treatment, such as apparatus and a condition of compression, is the same as in the case of the radiation image storage panel.

The pressure in compression is generally not less than 50 kgw/cm$^2$.

The void ratio and the packing ratio of the phosphor layer formed on the support in the manner described above can be calculated theoretically by the following formulae (I)–(III).

In the radiographic intensifying screen of the present invention, it is preferable to provide a transparent protective film.

Among the radiographic intensifying screens produced by the above-described processes, a screen having a phosphor layer in which the packing ratio of the phosphor is not less than 67% provides an image of excellent quality.

The examples of the present invention, the comparison examples and the reference examples are given below, but the examples are construed by no means to restrict the invention.

RADIATION IMAGE STORAGE PANEL

A. Comparison between the panel of the present invention using thermoplastic elastomer as a binder and a known panel of which binder is rigid resin.

I. Radiation image storage panel using BaFBr:$Eu^{2+}$ phosphor

EXAMPLE 1

To the mixture of 200 g of BaFBr:$Eu^{2+}$ phosphor, 20 g of thermoplastic polyurethane elastomer (Desmolac TPKL-5-2625; available from Sumitomo Bayer Urethane Co., Ltd.; solid content: 40%; Vicat softening point: 45° C. [ASTM D1525]) and 20 g of 10% methyl ethyl ketone solution of nitrocellulose (nitrification degree: 11.5%), methyl ethyl ketone was added. The resulting mixture was stirred by means of propeller agitator to prepare a coating dispersion having a viscosity of 30 PS (at 25° C.).

The obtained dispersion was coated by using a doctor blade on a polyethylene terephthalate film (a support) which had been beforehand coated with flexible acryl resin and nitrocellulose, and the coated layer of the dispersion was heated to prepare a phosphor layer (thickness: 300 μm).

Subsequently, thus prepared phosphor layer was compressed under a pressure of 400 kgw/$cm^2$ and at a temperature of 80° C.

On the phosphor layer of the support having been subjected to the compression treatment was placed a transparent polyethylene terephthalate film (thickness: 10 μm; provided with a polyester adhesive layer) to provide a transparent protective film.

Thus, a radiation image storage panel consisting of a support, a subbing layer, a phosphor layer and a transparent protective film was prepared.

EXAMPLE 2

The procedure of Example 1 was repeated except that the phosphor layer was subject to a compression treatment under a pressure of 600 kgw/$cm^2$ and at a temperature of 80° C. to prepare a radiation image storage panel consisting of a support, a subbing layer, a phosphor layer and a transparent protective film.

COMPARISON EXAMPLE 1

The procedure of Example 1 was repeated except for using polyester resin (Espel 1510; available from Hitachi Chmical Co., Ltd.; solid content: 8%) as a binder in a coating dispersion to prepare a radiation image storage panel consisting of a support, a subbing layer, a phosphor layer and a transparent protective film.

COMPARISON EXAMPLE 2

The procedure of Example 1 was repeated except that the phosphor layer was not subject to a compression treatment to prepare a radiation image storage panel consisting of a support, a subbing layer, a phosphor layer and a transparent protective film.

COMPARISON EXAMPLE 3

The procedure of Comparison Example 1 was repeated except that the phosphor layer was not subject to a compression treatment to prepare a radiation image storage panel consisting of a support, a subbing layer, a phosphor layer and a transparent protective film.

COMPARISON EXAMPLE 4

The procedure of Comparison Example 1 was repeated except that the phosphor layer was subject to a compression treatment under a pressure of 600 kgw/$cm^2$ and at a temperature of 80° C. to prepare a radiation image storage panel consisting of a support, a subbing layer, a phosphor layer and a transparent protective film.

COMPARISON EXAMPLE 5

The procedure of Comparison Example 1 was repeated except that the phosphor layer was subject to a compression treatment under a pressure of 800 kgw/$cm^2$ and at a temperature of 80° C. to prepare a radiation image storage panel consisting of a support, a subbing layer, a phosphor layer and a transparent protective film.

Evaluation of Radiation Image Storage Panel

There were measured the qualities of images provided by the radiation image storage panels obtained in the above-described Examples and Comparison Example in the following manner. Each of the panels was exposed to X-ray at 80 KeV for 10 seconds, and then excited by the light of a He-Ne laser. Then the stimulated emission emitted from the panel was detected and converted to the corresponding electric signal. The electric signals were reproduced by an image reproducing apparatus to obtain a visible image on a display. The sharpness of a image was evaluated according to the modulation transfer function (MTF) value at the spacial frequency of 2 cycle/mm, and the graininess (RMS) at the dose of 0.1 mR was also determined.

The results are shown in FIG. 1, in which circles represent qualities of images provided by the panels.

The vertical axis in FIG. 1 represents sharpness (MTF value at the spacial frequency of 2 cycle/mm). Therefore, a circle plotted at a high position in FIG. 1 means that the image represented by the circle has good sharpness. The horizontal axis represents graininess. Therefore, a circle plotted at a left position in FIG. 1 means that the image represented by the circle has good graininess.

II. Radiation image storage panel using BaF$_{0.9}$I$_{0.1}$:$Eu^{2+}$ phosphor

EXAMPLE 3

To the mixture of 200 g of BaF$_{0.9}$I$_{0.1}$:$Eu^{2+}$ phosphor, 80 g of toluene solution of ethylene vinyl acetate copolymer (Everflex EV-210; available from Mitsui Du-Pont Polychmical Co., Ltd.; solid content: 10%; Vicat softening point: 40° C.) as a binder and 2.0 g of solid content of an epoxy resin of bisphenol A type (molecular weight: 500) as a a anti yellowing agent, methyl ethyl ketone was added. The resulting mixture was stirred by means of propeller agitator to prepare a coating dispersion for a phosphor layer having a viscosity of 30 PS (at 25° C.) (ratio of binder/phosphor=1/20).

On the other hand, 214 g of BaFBr (in which the size of 90% particles of content is within the range of 1-5 μm), 25.7 g of solid content of flexible acryl resin, 10.7 g of epoxy resin and 64 g of nitrocellulose (nitrification degree: 11.5%, solid content: 10 wt. %) were added to methyl ethyl ketone. The resulting mixture was stirred by means of propeller agitator to prepare a coating dispersion for a light-reflecting layer having a viscosity of 25-35 PS (at 25° C.).

The obtained dispersion for a light-reflecting layer was coated by using a doctor blade on a polyethylene terephthalate film (a support, thickness: 300 μm) which had been beforehand coated with flexible acryl resin and nitrocellulose, and sequentially a dispersion for a phosphor layer was coated superposedly on the coated film of dispersion for a light-reflecting layer. The coated layers were heated at a temperature gradually rising from 25° C. to 100° C. to prepare a light-reflecting layer (thickness: 60 μm) and a phosphor layer thickness: 250 μm) on the support.

Subsequently, thus prepared panel consisting of a support, a light-reflecting layer and a phosphor layer was compressed under a pressure of 400 kgw/cm$^2$ and at a temperature of 60° C.

On the phosphor layer of the support having been subjected to the compression treatment was placed a transparent polyethylene terephthalate film (thickness: 10 μm; provided with a polyester adhesive layer) to provide a transparent protective film.

Thus, a radiation image storage panel consisting of a support, a subbing layer, a light-reflecting layer, a phosphor layer and a transparent protective film was prepared.

EXAMPLE 4

The procedure of Example 3 was repeated except that the phosphor layer was subject to a compression treatment under a pressure of 600 kgw/cm$^2$ and at a temperature of 60° C. to prepare a radiation image storage panel consisting of a support, a subbing layer, a light-reflecting layer, a phosphor layer and a transparent protective film.

COMPARISON EXAMPLE 6

The procedure of Example 3 was repeated except for using 80 g of toluene solution of polyacryl resin (Dinal BR102; available from Mitsubishi Rayon Co., Ltd.; solid content: 10%) as a binder in a coating dispersion for phosphor layer to prepare a radiation image storage panel consisting of a support, a subbing layer, a light-reflecting layer, a phosphor layer and a transparent protective film.

COMPARISON EXAMPLE 7

The procedure of Example 3 was repeated except that the phosphor layer was not subject to a compression treatment to prepare a radiation image storage panel consisting of a support, a subbing layer, a light-reflecting layer, a phosphor layer and a transparent protective film.

COMPARISON EXAMPLE 8

The procedure of Comparison Example 6 was repeated except that the phosphor layer was not subject to a compression treatment to prepare a radiation image storage panel consisting of a support, a subbing layer, a light-reflecting layer, a phosphor layer and a transparent protective film.

COMPARISON EXAMPLE 9

The procedure of Comparison Example 6 was repeated except that the phosphor layer was subject to a compression treatment under a pressure of 600 kgw/cm$^2$ and at a temperature of 60° C. to prepare a radiation image storage panel consisting of a support, a subbing layer, a light-reflecting layer, a phosphor layer and a transparent protective film.

COMPARISON EXAMPLE 10

The procedure of Comparison Example 6 was repeated except that the phosphor layer was subject to a compression treatment under a pressure of 800 kgw/cm$^2$ and at a temperature of 60° C. to prepare a radiation image storage panel consisting of a support, a subbing layer, a light-reflecting layer, a phosphor layer and a transparent protective film.

Evaluation of Radiation Image Storage Panel

There were measured the qualities of images provided by the radiation image storage panels obtained in Examples 3-4 and Comparison Examples 6-10 in the same manner as in the panels using BaFBr:Eu$^{2+}$ such as those of Examples 1-2 and Comparison Examples 1-5.

Figure 2:
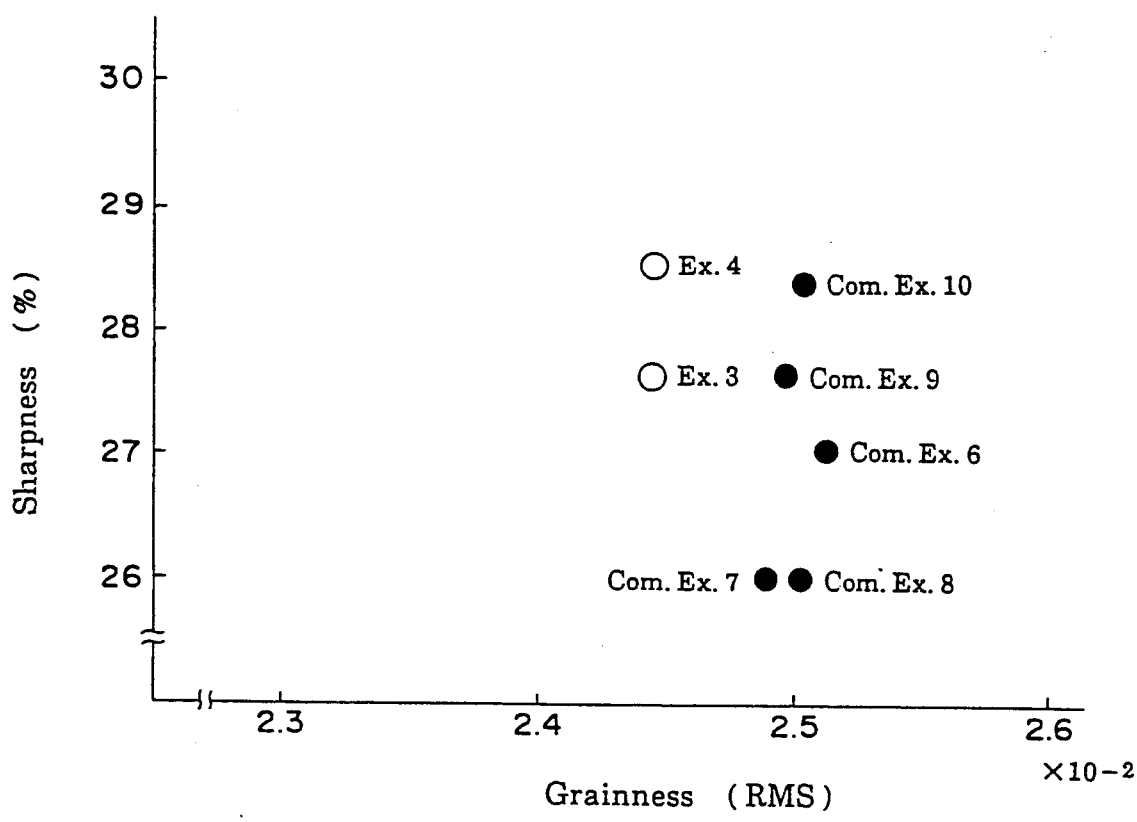

The results are shown in FIG. 2, in which circles represent qualities of images provided by the panels.

The vertical axis in FIG. 2 represents sharpness (MTF value at the spacial frequency of 2 cycle/mm). Therefore, a circle plotted at a high position in FIG. 2 means that the image represented by the circle has good sharpness. The horizontal axis represents graininess. Therefore, a circle plotted at a left position in FIG. 2 means that the image represented by the circle has good graininess.

III. Radiation image storage panel using GdOCl:Ce$^{3+}$ phosphor

EXAMPLE 5

To the mixture of 200 g of GdOCl:Ce$^{3+}$ phosphor, 80 g of methyl ethyl ketone solution of thermoplastic polybutadiene (TR2000; available from Japan Synthetic Rubber Co., Ltd.; solid content: 10 wt. %; Vicat softening point: 47° C.) and 20 g of nitrocellulose (solid content: 10 wt. %), methyl ethyl ketone was added. The resulting mixture was stirred by means of propeller agitator to prepare a coating dispersion for a phosphor layer. After the a coating dispersion for a phosphor layer was prepared, the procedure of Example 3 was repeated except for the preparation of a coating dispersion for a phosphor layer, to obtain a radiation image storage panel consisting of a support, a subbing layer, a light-reflecting layer, a phosphor layer and a transparent protective film.

EXAMPLE 6

The procedure of Example 5 was repeated except that the phosphor layer was subject to a compression treatment under a pressure of 600 kgw/cm$^2$ and at a temperature of 60° C. to prepare a radiation image storage panel consisting of a support, a subbing layer, a light-reflecting layer, a phosphor layer and a transparent protective film.

COMPARISON EXAMPLE 11

The procedure of Example 5 was repeated except for using polyacryl resin (Criscoat P1120; available from Dainippon Ink Co., Ltd.) as a binder in a coating dispersion for phosphor layer to prepare a radiation image storage panel consisting of a support, a subbing layer, a light-reflecting layer, a phosphor layer and a transparent protective film.

COMPARISON EXAMPLE 12

The procedure of Example 5 was repeated except that the phosphor layer was not subject to a compression treatment to prepare a radiation image storage panel consisting of a support, a subbing layer, a light-reflecting layer, a phosphor layer and a transparent protective film.

COMPARISON EXAMPLE 13

The procedure of Comparison Example 11 was repeated except that the phosphor layer was not subject to a compression treatment to prepare a radiation image storage panel consisting of a support, a subbing layer, a light-reflecting layer, a phosphor layer and a transparent protective film.

COMPARISON EXAMPLE 14

The procedure of Comparison Example 11 was repeated except that the phosphor layer was subject to a compression treatment under a pressure of 600 kgw/cm$^2$ and at a temperature of 60° C. to prepare a radiation image storage panel consisting of a support, a subbing layer, a light-reflecting layer, a phosphor layer and a transparent protective film.

COMPARISON EXAMPLE 15

The procedure of Comparison Example 11 was repeated except that the phosphor layer was subject to a compression treatment under a pressure of 800 kgw/cm$^2$ and at a temperature of 60° C. to prepare a radiation image storage panel consisting of a support, a subbing layer, a light-reflecting layer, a phosphor layer and a transparent protective film.

Evaluation of Radiation Image Storage Panel

There were measured the qualities of images provided by the radiation image storage panels obtained in Examples 5–6 and Comparison Examples 11–15 in the same manner as in the panels using BaFBr:Eu$^{2+}$ such as those of Examples 1–2 and Comparison Examples 1–5 or the panels using BaF$_{0.9}$I$_{0.1}$:Eu$^{2+}$ such as those of Examples 3–4 and Comparison Examples 6–10.

Figure 3:
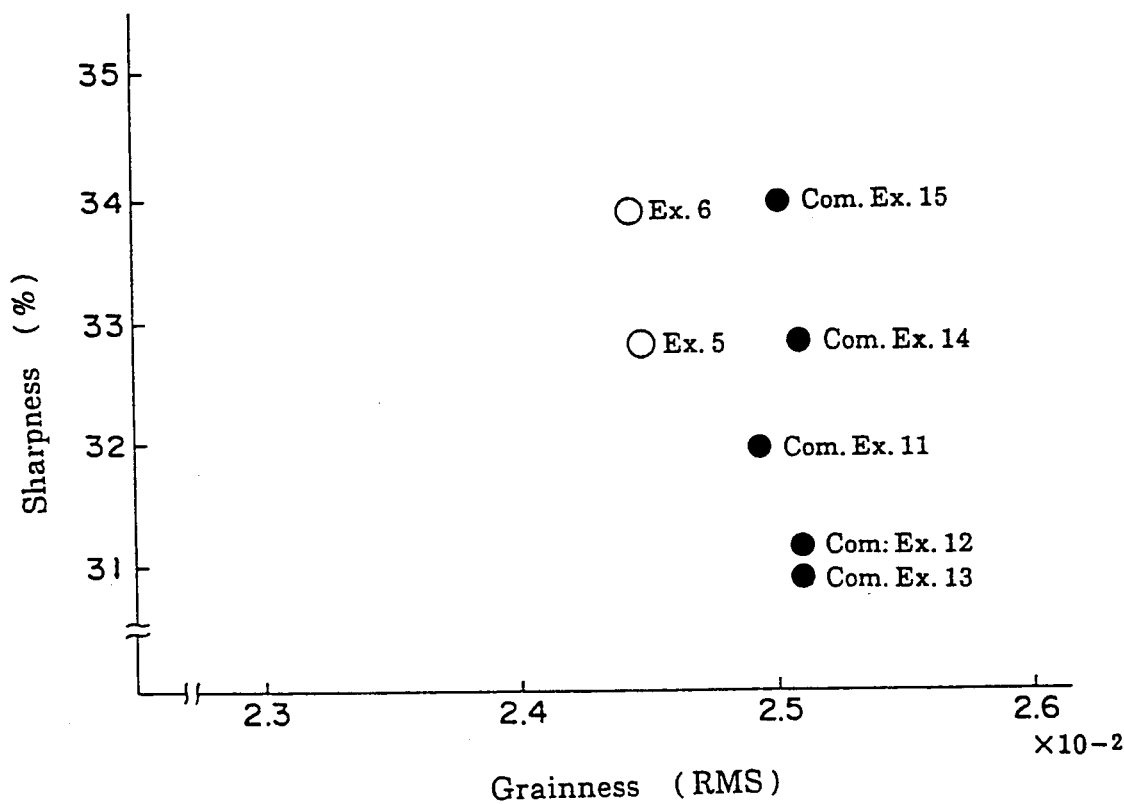

The results are shown in FIG. 3, in which circles represent qualities of images provided by the panels.

The vertical axis in FIG. 3 represents sharpness (MTF value at the spacial frequency of 2 cycle/mm). Therefore, a circle plotted at a high position in FIG. 3 means that the image represented by the circle has good sharpness. The horizontal axis represents graininess. Therefore, a circle plotted at a left position in FIG. 3 means that the image represented by the circle has good graininess.

As is evident from FIGS. 1–3, the radiation image storage panel of the invention provides an image of considerably improved graininess as compared with the panels of Comparison Examples, while sharpness is kept at the same level.

B. Comparison between the panel of the invention having a phosphor layer simultaneously compressed and affixed on the support, and the panel having a phosphor layer independently compressed and provided on the support.

EXAMPLE 7

To the mixture of 200 g of BaF$_{0.9}$I$_{0.1}$:Eu$^{2+}$ phosphor, 22.5 g of polyurethane (Desmolac TPKL-5-2625; available from Sumitomo Bayer Urethane Co., Ltd.; solid content: 40%) as a binder and 1.0 g of an epoxy resin (Epicoat 1001; available from Yuka Shell Epoxy Co., Ltd.) as a anti-yellowing agent, a mixed solvent of methyl ethyl ketone and 2-propanol (1:1) was added. The resulting mixture was stirred by means of propeller agitator to prepare a coating dispersion for a phosphor layer having a viscosity of 30 PS (at 25° C.) (ratio of binder/phosphor = 1/20).

The obtained dispersion was coated on a polyethylene terephthalate film (a false support, thickness: 180 μm) which had been beforehand coated with a silicon release agent. After drying, the coated film was peeled off to obtain the phosphor sheet.

On the other hand, 214 g of BaFBr (in which the size of 90% particles of content is within the range of 1–5 μm), 25.7 g of solid content of flexible acryl resin, 10.7 g of epoxy resin and 64 g of nitrocellulose (nitrification degree: 11.5%, solid content: 10 wt. %) were added to methyl ethyl ketone. The resulting mixture was stirred by means of propeller agitator to prepare a coating dispersion for a light-reflecting layer having a viscosity of 25–35 PS (at 25° C.).

Further, 90 g of solid content of flexible acryl resin and 50 g of nitrocellulose (nitrification degree: 11.5%, solid content: 10 wt. %) were added to methyl ethyl ketone. The resulting mixture was stirred to prepare a coating dispersion for a subbing layer having a viscosity of 3–6 PS (at 25° C.).

The obtained dispersion for a subbing layer was coated by using a doctor blade on a polyethylene terephthalate film (a support, thickness: 300 μm) which had been placed on a glass plate. The coated layers were heated at a temperature gradually rising from 25° C. to 100° C. to prepare a subbing layer (thickness: 15 μm). The dispersion for a light-reflecting layer was coated superposedly on the subbing layer and the coated film was dried in the same manner to prepare a light-reflecting layer on a subbing layer. Thus a subbing layer and a light-reflecting layer were formed on the support. The phosphor sheet formed beforehand was laid on the light-reflecting layer, then the compression treatment was carried out.

The obtained panel was compressed continuously under a pressure of 400 kgw/cm$^2$ and at a temperature of 80° C. By this compression treatment, the phosphor sheet and the light-reflecting layer on the support were completely welded.

On the phosphor layer of the support having been subjected to the compression treatment was placed a transparent polyethylene terephthalate film (thickness: 10 μm; provided with a polyester adhesive layer) to provide a transparent protective film.

Thus, a radiation image storage panel consisting of a support, a subbing layer, a light-reflecting layer, a phosphor layer and a transparent protective film was prepared.

EXAMPLE 8

The procedure of Example 7 was repeated except that the phosphor sheet was subject to a compression treatment under a pressure of 600 kgw/cm$^2$ and at a temperature of 80° C. to prepare a radiation image storage panel consisting of a support, a subbing layer, a light-reflecting layer, a phosphor layer and a transparent protective film.

EXAMPLE 9

The procedure of Example 7 was repeated except that the phosphor sheet was subject to a compression treatment under a pressure of 800 kgw/cm$^2$ and at a temperature of 80° C. to prepare a radiation image storage panel consisting of a support, a subbing layer, a light-reflecting layer, a phosphor layer and a transparent protective film.

REFERENCE EXAMPLE 1

The dispersion for a light-reflecting layer was coated superposedly on a subbing layer which had been formed in the same manner as in Example 7. Subsequently, the dispersion for a phosphor layer was coated superposedly on the coated light-reflecting layer within the light-reflecting layer was not dried. The coated layers were heated at a temperature gradually rising from 25° C. to 100° C. to prepare a sheet consisting of a support, a subbing layer, a light-reflecting layer and a phosphor layer. The phosphor sheet was subject to a compression treatment under a pressure of 400 kgw/cm$^2$ and at a temperature of 80° C. by means of a calender roll in the same manner as in Example 7. A protective film was provided on a phosphor layer in the same manner as in Example 7 to obtain a radiation image storage panel consisting of a support, a subbing layer, a light-reflecting layer, a phosphor layer and a transparent protective film.

REFERENCE EXAMPLE 2

The procedure of Reference Example 1 was repeated except that the phosphor sheet was subject to a compression treatment under a pressure of 600 kgw/cm$^2$ and at a temperature of 80° C. to prepare a radiation image storage panel consisting of a support, a subbing layer, a light-reflecting layer, a phosphor layer and a transparent protective film.

REFERENCE EXAMPLE 3

The procedure of Reference Example 1 was repeated except that the phosphor sheet was subject to a compression treatment under a pressure of 800 kgw/cm$^2$ and at a temperature of 80° C. to prepare a radiation image storage panel consisting of a support, a subbing layer, a light-reflecting layer, a phosphor layer and a transparent protective film.

COMPARISON EXAMPLE 16

The procedure of Reference Example 1 was repeated except that the phosphor sheet was not subject to a compression treatment to prepare a radiation image storage panel consisting of a support, a subbing layer, a light-reflecting layer, a phosphor layer and a transparent protective film.

The Packing Ratios and Void Ratios of the Phosphor Layers of the Radiation Image Storage Panels The packing ratios and void ratios of the phosphor layers of the radiation image storage panels prepared in above described Examples and Reference Examples were calculated from the aforementioned formulae (II) and (III) using a density of the phosphor (5.1 g/cm$^3$) and a density of the binder (1.14 g/cm$^3$).

The results are set forth in Table 1.

TABLE 1

| | Pressure (kg/cm$^3$) | Packing ratio (%) | Void ratio (%) |
|---|---|---|---|
| Example 7 | 400 | 70.6 | 13.6 |
| Reference Example 1 | 400 | 66.7 | 18.4 |
| Example 8 | 600 | 72.5 | 11.3 |
| Reference Example 2 | 600 | 68.7 | 15.9 |
| Example 9 | 800 | 74.5 | 8.8 |
| Reference Example 3 | 800 | 70.7 | 13.6 |
| Reference Example 1 | — | 58.8 | 28.0 |

As is evident from Table 1, the phosphor layer of each radiation image storage panel of Examples has a high packing ratio and a low void ratio as compared with that of the panel of the corresponding Reference Example compressed with the same pressure.

Evaluation of Radiation Image Storage Panel

There were measured the qualities of images provided by the radiation image storage panels obtained in the same manner as described above.

Figure 4:
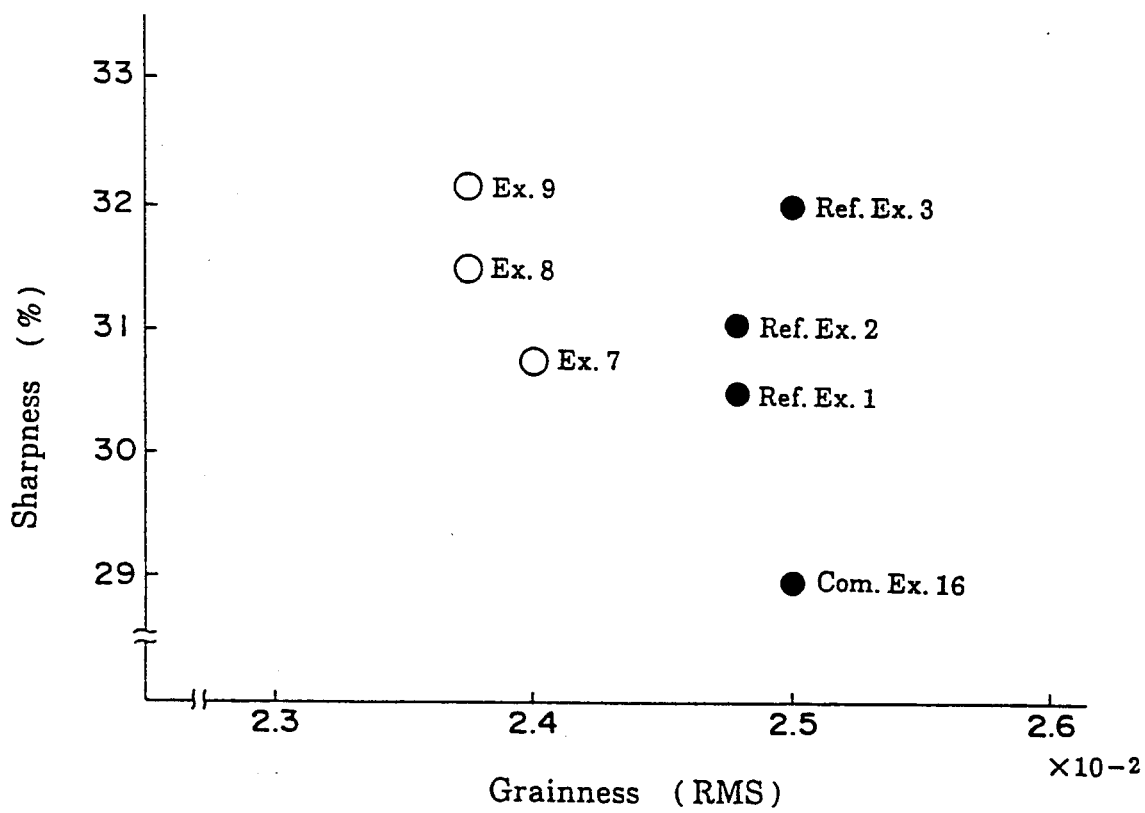
–FIG. 4 shows the qualities of the radiation image storage panels concerning to Examples, Comparison Examples and Reference Examples.

The results are shown in FIG. 4, in which circles represent qualities of images provided by the panels.

The vertical axis in FIG. 4 represents sharpness (MTF value at the spacial frequency of 2 cycle/mm). Therefore, a circle plotted at a high position in FIG. 4 means that the image represented by the circle has good sharpness. The horizontal axis represents graininess. Therefore, a circle plotted at a left position in FIG. 4 means that the image represented by the circle has good graininess.

As is evident from FIG. 4, the radiation image storage panel having a phosphor layer simultaneously compressed and affixed on the support provides an image of considerably improved graininess and a little improved sharpness as compared with the panels having a phosphor layer independently compressed and provided on the support.

C. Comparison between the panel of the invention using a phosphor layer treated with titanate coupling agent, and the panel using a phosphor with no treatment or treated with other coupling agent.

EXAMPLE 10

To the dispersion of 100 g of BaF$_{0.9}$I$_{0.1}$:Eu$^{2+}$ phosphor in 50 g of 2-propanol, 0.25 g (0.5 wt. % of the solvent) of terraoctyl bis(di-tridecylphosphite) titanate (Plen Act KR46B; available from Ajinomoto Co., Inc.) was added. The resulting dispersion was stirred for 4 hours by means of roller mill. After classification, the phosphor was dried at 150° C. under reduced pressure.

To prepare a dispersion for a phosphor sheet, 100 g of the phosphor having been treated in the manner described above, 22.5 g of polyurethane (Desmolac TPKL-5-2625; available from Sumitomo Bayer Urethane Co., Ltd.; solid content: 40%) as a binder and 1.0 g of an epoxy resin of bisphenol A type as a anti-yellowing agent was added to a mixed solvent of methyl ethyl ketone and 2-propanol (1:1). The resulting mixture was stirred by means of propeller agitator to prepare a coating dispersion for a phosphor layer having a viscosity of 30 PS (at 25° C.) (ratio of binder/phosphor = 1/20).

The obtained dispersion was coated on a polyethylene terephthalate film (a false support, thickness: 180 μm) which had been beforehand coated with a silicon release agent. After drying, the coated film was peeled off to obtain the phosphor sheet.

On the other hand, 214 g of BaFBr (in which the size of 90% particles of content is within the range of 1–5 μm), 25.7 g of solid content of flexible acryl resin, 10.7 g of epoxy resin and 64 g of nitrocellulose (nitrification degree: 11.5%, solid content: 10 wt. %) were added to methyl ethyl ketone. The resulting mixture was stirred by means of propeller agitator to prepare a coating dispersion for a light-reflecting layer having a viscosity of 25–35 PS (at 25° C.).

Further, 90 g of solid content of flexible acryl resin and 50 g of nitrocellulose (nitrification degree: 11.5%, solid content: 10 wt. %) were added to methyl ethyl ketone. The resulting mixture was stirred to prepare a coating dispersion for a subbing layer having a viscosity of 3–6 PS (at 25° C.).

The obtained dispersion for a subbing layer was coated by using a doctor blade on a polyethylene terephthalate film (a support, thickness: 300 μm) which had been placed on a glass plate. The coated layers were heated at a temperature gradually rising from 25° C. to 100° C. to prepare a subbing layer (thickness: 15 μm). The dispersion for a light-reflecting layer was coated superposedly on the subbing layer and the coated film was dried in the same manner to prepare a light-reflecting layer on a subbing layer. Thus a subbing layer and a light-reflecting layer were formed on the support. The phosphor sheet formed beforehand was laid on the light-reflecting layer, then the compression treatment was carried out.

The obtained panel was compressed continuously under a pressure of 400 kgw/cm$^2$ and at a temperature of 80° C. By this compression treatment, the phosphor sheet and the light-reflecting layer on the support were completely welded.

On the phosphor layer of the support having been subjected to the compression treatment was placed a transparent polyethylene terephthalate film (thickness: 10 μm; provided with a polyester adhesive layer) to provide a transparent protective film.

Thus, a radiation image storage panel consisting of a support, a subbing layer, a light-reflecting layer, a phosphor layer and a transparent protective film was prepared.

REFERENCE EXAMPLE 4

The procedure of Example 10 was repeated except for using a silane coupling agent: γ-glycideoxypropyltrimethoxy silane (KBM403; available from Shinetsu Chmical Industry Co., Ltd.) instead of a titanate coupling agent to prepare a radiation image storage panel consisting of a support, a subbing layer, a light-reflecting layer, a phosphor layer and a transparent protective film.

REFERENCE EXAMPLE 5

The procedure of Example 10 was repeated except that the phosphor was not treated with any agent to prepare a radiation image storage panel consisting of a support, a subbing layer, a light-reflecting layer, a phosphor layer and a transparent protective film.

Evaluation of Radiation Image Storage Panel

The packing ratios the phosphor layers of the radiation image storage panels prepared in above described Examples and Reference Examples were calculated from the aforementioned formula (III) using a density of the phosphor (5.1 g/cm$^3$) and a density of the binder (1.14 g/cm$^3$).

The luminances of stimulated emissions of the panels were also measured. The panels were excited with the light of He-Ne laser (wavelength: 632.8 nm) after exposure to X-rays at 80 KVp. The stimulated emission emitted from each of the panels was detected to measure a luminance of stimulated emission thereof.

The results are set forth in Table 2.

The values of luminance were relatively determined on the basis of the luminance of the panel of Reference Example 4 to be set at 100.

TABLE 2

|  | Luminance | Packing Ratio (%) |
|---|---|---|
| Example 10 | 107 | 73.4 |
| Reference Example 4 | 100 | 70.6 |
| Reference Example 5 | 98 | 70.5 |

As is evident from Table 2, the radiation image storage panel using a phosphor treated with titanate coupling agent exhibits improved luminance and has a phosphor layer having a high packing ratio. As is also evident from Table 2, the packing ratio can be improved and and the deterioration of sensitivity can be inhibited by the process for the preparation of the radiation image storage panel of the invention.

RADIOGRAPHIC INTENSIFYING SCREEN

A. Comparison between the screen of the present invention using thermoplastic elastomer as a binder and a known screen of which binder is rigid resin.

EXAMPLE 11

200 g of Gd$_2$OS:Tb phosphor, 20 g of thermoplastic polyurethane elastomer (Desmolac TPKL-5-2625; available from Sumitomo Bayer Urethane Co., Ltd.; solid content: 40%) and 2 g of nitrocellulose (nitrification degree: 11.5%) as a binder were added to methyl ethyl ketone. The resulting mixture was stirred by means of propeller agitator to prepare a coating dispersion for a phosphor layer having a viscosity of 30 PS (at 25° C.) (ratio of binder/phosphor = 1/20).

On the other hand, 90 g of solid content of flexible acryl resin and 50 g of nitrocellulose were added to methyl ethyl ketone. The resulting mixture was stirred to prepare a coating dispersion for a subbing layer having a viscosity of 3–6 PS (at 25° C.).

The obtained dispersion for a subbing layer was coated by using a doctor blade on a polyethylene terephthalate film containing titanium oxide (a support, thickness: 250 μm) which had been placed on a glass plate. The coated layers were heated at a temperature gradually rising from 25° C. to 100° C. to prepare a subbing layer (thickness: 15 μm). The dispersion for a phosphor layer was coated superposedly on the subbing layer so that the thickness of the coated phosphor layer might be 180 μm, and the coated film was dried to prepare a phosphor layer, then the compression treatment was carried out.

The prepared screen was compressed under a pressure of 400 kgw/cm$^2$ and at a temperature of 80° C.

On the phosphor layer of the support having been subjected to the compression treatment was placed a transparent polyethylene terephthalate film (thickness:

10 μm; provided with a polyester adhesive layer) to provide a transparent protective film.

Thus, a radiographic intensifying screen consisting of a support, a subbing layer, a phosphor layer and a transparent protective film was prepared.

EXAMPLE 12

The procedure of Example 11 was repeated except that the phosphor layer was subject to a compression treatment under a pressure of 600 kgw/cm$^2$ and at a temperature of 80° C. to prepare a radiographic intensifying screen consisting of a support, a subbing layer, a phosphor layer and a transparent protective film.

COMPARISON EXAMPLE 17

The procedure of Example 11 was repeated except that the phosphor layer was not subject to a compression treatment to prepare a radiographic intensifying screen consisting of a support, a subbing layer, a phosphor layer and a transparent protective film.

COMPARISON EXAMPLE 18

The procedure of Example 11 was repeated except that the dispersion for a phosphor layer was prepared by adding 200 g of $Gd_2O_2S$:Tb phosphor, 20 g of polyester resin (Espel 1510; available from Hitachi Chmical Co., Ltd.; solid content: 8%) and 2 g of nitrocellulose (nitrification degree: 11.5%) to methyl ethyl ketone to prepare a radiographic intensifying screen consisting of a support, a subbing layer, a phosphor layer and a transparent protective film.

COMPARISON EXAMPLE 19

The procedure of Comparison Example 18 was repeated except that the phosphor layer was subject to a compression treatment under a pressure of 600 kgw/cm$^2$ and at a temperature of 80° C. to prepare a radiographic intensifying screen consisting of a support, a subbing layer, a phosphor layer and a transparent protective film.

COMPARISON EXAMPLE 20

The procedure of Comparison Example 18 was repeated except that the phosphor layer was not subject to a compression treatment to prepare a radiographic intensifying screen consisting of a support, a subbing layer, a phosphor layer and a transparent protective film.

EXAMPLE 13

The procedure of Example 11 was repeated except that the dispersion for a phosphor layer was prepared by adding 200 g of $Gd_2O_2S$:Tb phosphor, 8 g of thermoplastic polybutadiene (TR2000; available from Japan Synthetic Rubber Co., Ltd.; solid content: 10 wt. %; Vicat softening point: 47° C.) and 2 g of nitrocellulose (nitrification degree: 11.5%) to methyl ethyl ketone to prepare a radiographic intensifying screen consisting of a support, a subbing layer, a phosphor layer and a transparent protective film.

EXAMPLE 14

The procedure of Example 13 was repeated except that the phosphor layer was subject to a compression treatment under a pressure of 600 kgw/cm$^2$ and at a temperature of 80° C. to prepare a radiographic intensifying screen consisting of a support, a subbing layer, a phosphor layer and a transparent protective film.

COMPARISON EXAMPLE 21

The procedure of Example 13 was repeated except that the phosphor layer was not subject to a compression treatment to prepare a radiographic intensifying screen consisting of a support, a subbing layer, a phosphor layer and a transparent protective film.

COMPARISON EXAMPLE 22

The procedure of Example 13 was repeated except that the dispersion for a phosphor layer was prepared by adding 200 g of $Gd_2O_2S$:Tb phosphor, 8 g of polyacryl resin (Criscoat P1120; available from Dainippon Ink Co., Ltd.) and 2 g of nitrocellulose (nitrification degree: 11.5%) to methyl ethyl ketone to prepare a radiographic intensifying screen consisting of a support, a subbing layer, a phosphor layer and a transparent protective film.

COMPARISON EXAMPLE 23

The procedure of COMPARISON Example 22 was repeated except that the phosphor layer was subject to a compression treatment under a pressure of 600 kgw/cm$^2$ and at a temperature of 80° C. to prepare a radiographic intensifying screen consisting of a support, a subbing layer, a phosphor layer and a transparent protective film.

COMPARISON EXAMPLE 24

The procedure of Comparison Example 22 was repeated except that the phosphor layer was not subject to a compression treatment to prepare a radiographic intensifying screen consisting of a support, a subbing layer, a phosphor layer and a transparent protective film.

Evaluation of Radiographic Intensifying Screen

The radiographic intensifying screens prepared in the above Examples and Comparison Examples were evaluated in the following manner.

(1) The sharpness of image test

A radiographic intensifying screen was combined with X-ray film (HR-S; available from Fuji Photo Film Co., Ltd.) in a cassete, and exposed to X-rays at 80 KV$_p$ through an MTF chart. The film was then developed to obtain a visible image, and contrast transfer function (CTF) value was measured at the spacial frequency of 2 cycle/mm.

(2) The graininess of image test

A radiographic intensifying screen was combined with X-ray film (HR-S; available from Fuji Photo Film Co., Ltd.) in a cassete, and exposed to X-rays at 80 KV$_p$ through a water phantom (thickness: 10 cm) and an aluminum plate (thickness: 10 mm) at the concentration of 1.0. The exposed X-ray film was treated at 35° C. for 90 sec. with developer (RD III; available from Fuji Photo Film Co., Ltd.) by means of an automatic processor (New RD; available from Fuji Photo Film Co., Ltd.). The RMS value of the obtained image was measured by a microphotometer (aperture: 300 μm × 300 μm) and the graininess was evaluated from the RMS value.

The results are set forth in Table 3.

TABLE 3

|  | Sharpness CTF (%) | Graininess RMS ($\times 10^{-2}$) |
| --- | --- | --- |
| Example 11 | 28.1 | 1.40 |

TABLE 3-continued

|  | Sharpness CTF (%) | Graininess RMS ($\times 10^{-2}$) |
| --- | --- | --- |
| Example 12 | 29.8 | 1.44 |
| Comparison Example 17 | 27.0 | 1.44 |
| Comparison Example 18 | 27.9 | 1.48 |
| Comparison Example 19 | 29.0 | 1.52 |
| Comparison Example 20 | 27.4 | 1.43 |
| Example 13 | 28.5 | 1.40 |
| Example 14 | 30.4 | 1.42 |
| Comparison Example 21 | 27.5 | 1.46 |
| Comparison Example 22 | 28.3 | 1.54 |
| Comparison Example 23 | 29.6 | 1.55 |
| Comparison Example 24 | 27.8 | 1.50 |

Figure 5:
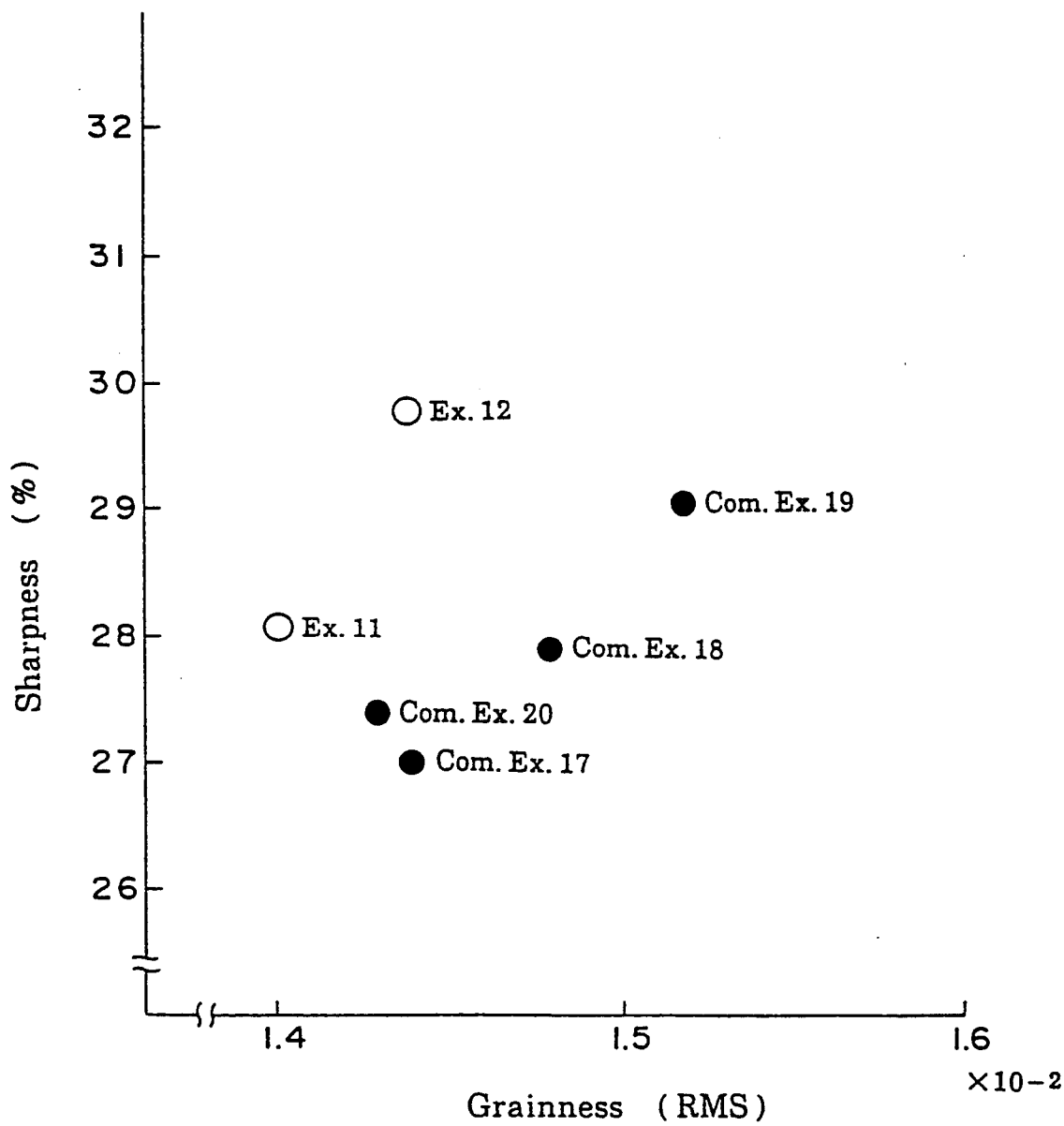
Figure 6:
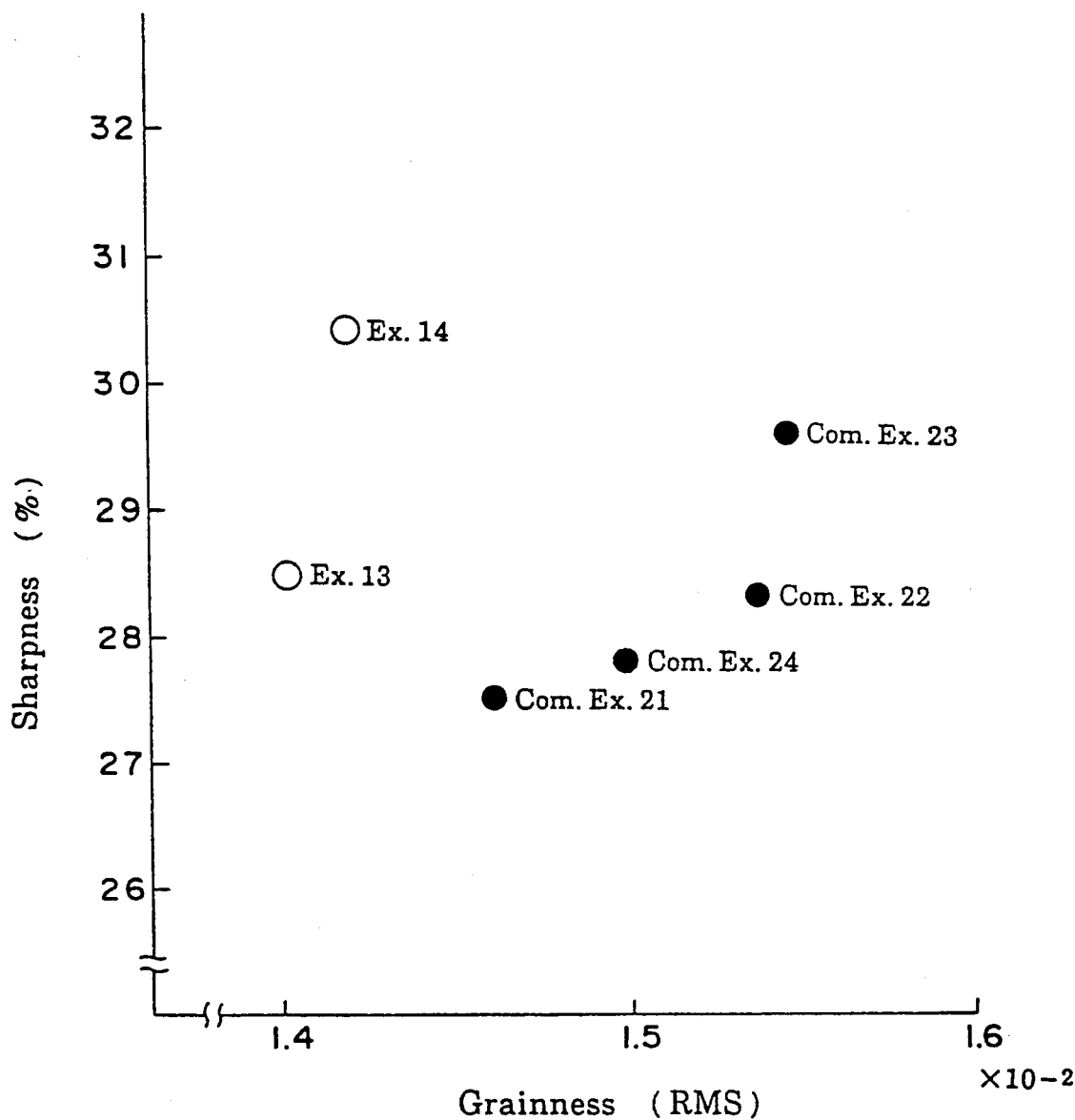

The results are also shown in FIGS. 5-6, in which circles represent qualities of images provided by the panels.

The vertical axis in FIGS. 5-6 represents sharpness (MTF value at the spacial frequency of 2 cycle/mm). Therefore, a circle plotted at a high position in FIGS. 5-6 means that the image represented by the circle has good sharpness. The horizontal axis represents graininess. Therefore, a circle plotted at a left position in FIGS. 5-6 means that the image represented by the circle has good graininess.

As is evident from Table 3 and FIGS. 5-6, the radiographic intensifying screen of the invention provides an image of considerably improved graininess and a little improved sharpness as compared with conventional screens.

B. Comparison between the screen of the invention having a phosphor layer simultaneously compressed and affixed on the support, and the screen having a phosphor layer independently compressed and provided on the support.

EXAMPLE 15

200 g of $Gd_2O_2S$:Tb phosphor, 20 g of thermoplastic polyurethane elastomer (Desmolac TPKL.5.2625; available from Sumitomo Bayer Urethane Co., Ltd.; solid content: 40%) and 2 g of nitrocellulose (nitrification degree: 11.5%) as a binder were added to methyl ethyl ketone. The resulting mixture was stirred by means of propeller agitator to prepare a coating dispersion for a phosphor layer having a viscosity of 30 PS (at 25° C.) (ratio of binder/phosphor=1/20).

The obtained dispersion was coated on a polyethylene terephthalate film (a false support, thickness: 180 μm) which had been beforehand coated with a silicon release agent, so that the thickness of the coated layer might be 180 mm. After drying, the coated film was peeled off to obtain the phosphor sheet.

On the other hand, 90 g of solid content of flexible acryl resin and 50 g of nitrocellulose were added to methyl ethyl ketone. The resulting mixture was stirred to prepare a coating dispersion for a subbing layer having a viscosity of 3-6 PS (at 25° C.).

The obtained dispersion for a subbing layer was coated by using a doctor blade on a polyethylene terephthalate film containing titanium oxide (a support, thickness: 250 μm) which had been placed on a glass plate. The coated layers were heated at a temperature gradually rising from 25° C. to 100° C. to prepare a subbing layer (thickness: 15 μm). The phosphor sheet formed beforehand was laid on the subbing layer, then the compression treatment was carried out.

The obtained screen was compressed continuously under a pressure of 400 kgw/cm² and at a temperature of 80° C. By this compression treatment, the phosphor sheet and the subbing layer on the support were completely welded.

On the phosphor layer of the support having been subjected to the compression treatment was placed a transparent polyethylene terephthalate film (thickness: 10 μm; provided with a polyester adhesive layer) to provide a transparent protective film.

Thus, a radiographic intensifying screen consisting of a support, a subbing layer, a phosphor layer and a transparent protective film was prepared.

EXAMPLE 16

The procedure of Example 15 was repeated except that the phosphor layer was subject to a compression treatment under a pressure of 600 kgw/cm² and at a temperature of 80 ° C. to prepare a radiographic intensifying screen consisting of a support, a subbing layer, a phosphor layer and a transparent protective film.

EXAMPLE 17

The procedure of Example 15 was repeated except that the phosphor layer was subject to a compression treatment under a pressure of 800 kgw/cm² and at a temperature of 80° C. to prepare a radiographic intensifying screen consisting of a support, a subbing layer, a phosphor layer and a transparent protective film.

REFERENCE EXAMPLE 6

The dispersion for a subbing layer was formed in the same manner as in Example 15. Subsequently, the dispersion for a phosphor layer was coated superposedly on the coated subbing layer within the subbing layer was not dried. The coated layers were heated at a temperature gradually rising from 25° C. to 100° C. to prepare a sheet consisting of a support, a subbing layer and a phosphor layer. The phosphor sheet was subject to a compression treatment under a pressure of 400 kgw/cm² and at a temperature of 80° C. by means of a calender roll. A protective film was provided on a phosphor layer in the same manner as i Example 15 to obtain a radiographic intensifying screen consisting of a support, a subbing layer, a phosphor layer and a transparent protective film.

REFERENCE EXAMPLE 7

The procedure of Reference Example 6 was repeated except that the phosphor layer was subject to a compression treatment under a pressure of 600 kgw/cm² and at a temperature of 80° C. to prepare a radiographic intensifying screen consisting of a support, a subbing layer, a phosphor layer and a transparent protective film.

REFERENCE EXAMPLE 8

The procedure of Reference Example 6 was repeated except that the phosphor layer was subject to a compression treatment under a pressure of 800 kgw/cm² and at a temperature of 80° C. to prepare a radiographic intensifying screen consisting of a support, a subbing layer, a phosphor layer and a transparent protective film.

REFERENCE EXAMPLE 9

The procedure of Reference Example 6 was repeated except that the phosphor layer was not subject to a compression treatment to prepare a radiographic intensifying screen consisting of a support, a subbing layer, a phosphor layer and a transparent protective film.

The Packing Ratios and Void Ratios of the Phosphor Layers of the Radiographic Intensifying Screens The packing ratios and void ratios of the phosphor layers of the radiographic intensifying screens prepared in above described Examples and Reference Examples were calculated from the aforementioned formulae (II) and (III) using a density of the phosphor (7.5 g/cm$^3$) and a density of the binder (1.14 g/cm$^3$).

The results are set forth in Table 3.

TABLE 4

|  | Pressure (kg/cm$^3$) | Packing ratio (%) | Void ratio (%) |
|---|---|---|---|
| Example 15 | 400 | 68.0 | 21.7 |
| Reference Example 6 | 400 | 64.1 | 26.2 |
| Example 16 | 600 | 70.1 | 19.2 |
| Reference Example 7 | 600 | 65.6 | 29.4 |
| Example 17 | 800 | 71.9 | 17.2 |
| Reference Example 8 | 800 | 68.7 | 20.9 |
| Reference Example 9 | — | 58.7 | 32.4 |

As is evident from Table 4, the phosphor layer of each radiographic intensifying screen of Examples has a high packing ratio and a low void ratio as compared with that of the screen of corresponding Reference Example compressed with the same pressure.

Evaluation of Radiographic Intensifying Screen

The radiographic intensifying screens prepared in the above Examples and Reference Examples were evaluated in the above-mentioned manner. The results are set forth in Table 5.

TABLE 5

|  | Relative Sensitivity | Sharpness CTF (%) | Graininess RMS ($\times 10^{-2}$) |
|---|---|---|---|
| Example 15 | 103 | 28.7 | 1.37 |
| Reference Example 6 | 95 | 28.1 | 1.40 |
| Example 16 | 105 | 30.2 | 1.32 |
| Reference Example 7 | 92 | 29.8 | 1.44 |
| Example 17 | 109 | 32.4 | 1.32 |
| Reference Example 8 | 85 | 32.5 | 1.51 |
| Reference Example 9 | 100 | 27.0 | 1.44 |

Figure 7:
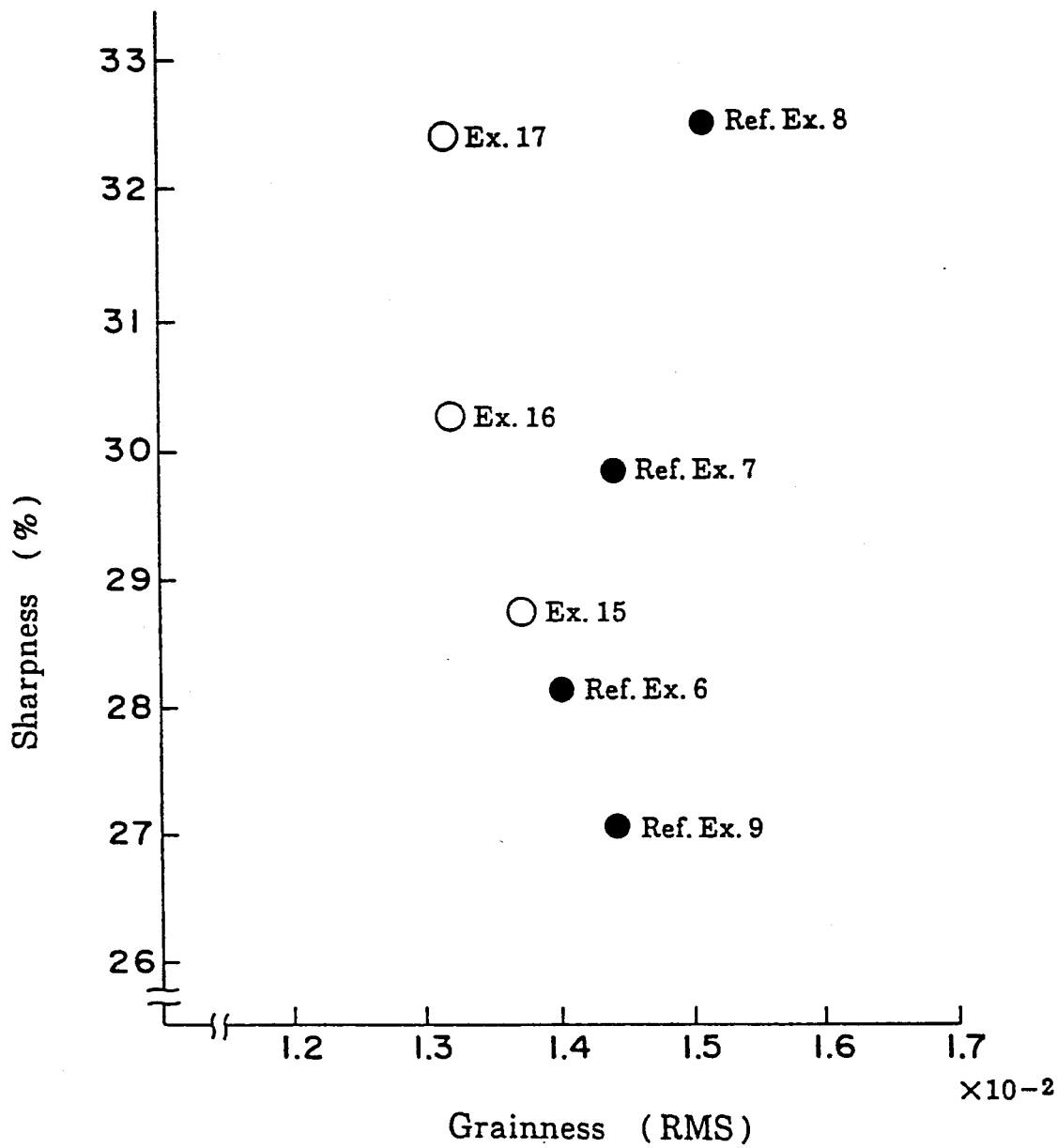
–FIG. 7 shows the qualities of the radiographic intensifying screen concerning to Examples, Comparison Examples and Reference Examples.

With respect to the quality of images, the results are also shown in FIG. 7.

The vertical axis in FIG. 7 represents sharpness (MTF value at the spacial frequency of 2 cycle/mm). Therefore, a circle plotted at a high position in FIG. 7 means that the image represented by the circle has good sharpness. The horizontal axis represents graininess. Therefore, a circle plotted at a left position in FIG. 7 means that the image represented by the circle has good graininess.

As is evident from Table 5 and FIG. 7, the radiographic intensifying screen of the invention has improved sensitivity and provides an image of improved graininess and sharpness as compared with that of the screen of corresponding Reference Example compressed with the same pressure. The radiographic intensifying screen prepared by the process of the invention provides an image of considerably improved graininess assuming that sharpness of an image and sensitivity are kept at the same level.

We claim:

1. A radiation image storage panel comprising a support and a phosphor layer provided thereon which contains a stimulable phosphor and a binder; wherein the packing ratio of said phosphor in said phosphor layer is not less than 70% and 10 wt. %–100 wt. % content is a thermoplastic elastomer selected from the group consisting of styrenic thermoplastic elastomer, polyolefin thermoplastic elastomer, thermoplastic polyurethane elastomer, polyester thermoplastic elastomer, polyamide thermoplastic elastomer, thermoplastic polybutadiene, ethylene-vinyl acetate copolymer, polyvinyl chloride thermoplastic elastomer, thermoplastic natural rubber, fluorocarbon thermoplastic elastomer, thermoplastic polyisoprene elastomer, chlorinated polyethylene thermoplastic elastomer, styrene-butadiene rubber, and silicon rubber.

2. The radiation image storage panel as claimed in claim 1, in which said binder consists of thermoplastic elastomer in its 100 wt. % content.

3. A radiation image storage panel comprising a support and a phosphor layer provided thereon which contains a stimulable phosphor and a binder; wherein the particles of said phosphor in said phosphor layer are treated with a titanate coupling agent, and said phosphor layer is compressed, to provide a packing ratio of the phosphor in the phosphor layer of not less than 70%, said binder containing 10 wt %–100 wt % of a thermoplastic elastomer.

4. The radiation image storage panel as claimed in claim 3, in which said titanate is pale yellow liquid.

5. A radiographic intensifying screen comprising a support and a phosphor layer provided thereon which contains a phosphor and a binder; wherein the packing ratio of said phosphor in said phosphor layer is not less than 67% and 10 wt. %–100 wt. % content of said binder is thermoplastic elastomer.

6. The radiographic intensifying screen as claimed in claim 5, in which said thermoplastic elastomer is at least one elastomer selected from the group consisting of styrenics thermoplastic elastomer, polyolefin thermoplastic elastomer, thermoplastic polyurethane elastomer, polyester thermoplastic elastomer, polyamide thermoplastic elastomer, thermoplastic polybutadiene, ethylene-vinyl acetate copolymer, polyvinyl chride thermoplastic elastomer, thermoplastic natural rubber, fluorocarbon thermoplastic elastomer, thermoplastic polyisoprene elastomer, chlorinated polyethylene elastomer, styrene-butadiene rubber and silicone rubber.

7. The radiographic intensifying screen as claimed in claim 5, in which said binder consists of thermoplastic elastomer in its 100 wt. % content.

* * * * *